US010922118B2

(12) United States Patent
Luo et al.

(10) Patent No.: US 10,922,118 B2
(45) Date of Patent: Feb. 16, 2021

(54) DISTRIBUTED CONTAINER IMAGE REPOSITORY SERVICE

(71) Applicant: International Business Machines Corporation, Armonk, NY (US)

(72) Inventors: Lan Luo, Beijing (CN); Jian Zhang, Beijing (CN); Jian Dong Yin, Beijing (CN); Wen Rui Zhao, Beijing (CN); Li Long Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 15/977,597

(22) Filed: May 11, 2018

(65) Prior Publication Data

US 2019/0347121 A1    Nov. 14, 2019

(51) Int. Cl.
*G06F 9/455* (2018.01)
*H04L 29/08* (2006.01)
(Continued)

(52) U.S. Cl.
CPC ........ *G06F 9/45558* (2013.01); *G06F 3/0644* (2013.01); *G06F 9/542* (2013.01);
(Continued)

(58) Field of Classification Search
None
See application file for complete search history.

(56) References Cited

U.S. PATENT DOCUMENTS 9,075,638 B2  7/2015 Barnett et al.
2016/0150007 A1* 5/2016 Balasubramanian ... G06F 21/10
709/217

(Continued)

FOREIGN PATENT DOCUMENTS

JP        6228691 B1    11/2017

OTHER PUBLICATIONS

T. Harter, et al. "*Slacker: Fast Distribution with Lazy Docker Containers*" 14th USENIX Conference on File Storage Technologies (FAST '16), Feb. 22-25, 2016.

*Primary Examiner* — Wynuel S Aquino
(74) *Attorney, Agent, or Firm* — Christopher Pignato, Esq.; George S. Blasiak, Esq.; Heslin, Rothenberg, Farley & Mesiti

(57) ABSTRACT

Methods, computer program products, and systems are presented. The method computer program products, and systems can include, for instance: obtaining, by a container host node, container image configuration data that defines a specified container image configuration, wherein the container host node includes an associated container image repository for storing container images; multicasting, by the container host node, a request for one or more image of first through Nth specified container images to a set of container host nodes; receiving, by the container host node, at least one container image from at least one container host node of the set of container host nodes in response to the multicasting; building, by the container host node, a specified container image according to the specified container image configuration using the at least one container image received by the receiving; and running, by the container host node, the specified container image built by the building to define a runtime container.

20 Claims, 12 Drawing Sheets

(51) Int. Cl.
*G06F 3/06* (2006.01)
*G06F 9/54* (2006.01)

(52) U.S. Cl.
CPC .... *H04L 67/34* (2013.01); *G06F 2009/45562* (2013.01); *G06F 2009/45575* (2013.01); *G06F 2009/45595* (2013.01)

(56) References Cited

U.S. PATENT DOCUMENTS

| | | |
|---|---|---|
| 2017/0070841 A1* | 3/2017 | Shalunov ................ H04L 67/34 |
| 2017/0147335 A1* | 5/2017 | Parees ...................... G06F 8/71 |
| 2017/0180346 A1 | 6/2017 | Suarez et al. |
| 2017/0220329 A1 | 8/2017 | Yang et al. |
| 2017/0300311 A1 | 10/2017 | Vasquez Lopez et al. |
| 2018/0365006 A1* | 12/2018 | Carvalho .................. G06F 8/71 |
| 2019/0199830 A1* | 6/2019 | Cannon ............... G06F 9/45558 |
| 2019/0334802 A1* | 10/2019 | Dutta ................. G06F 11/3034 |

* cited by examiner

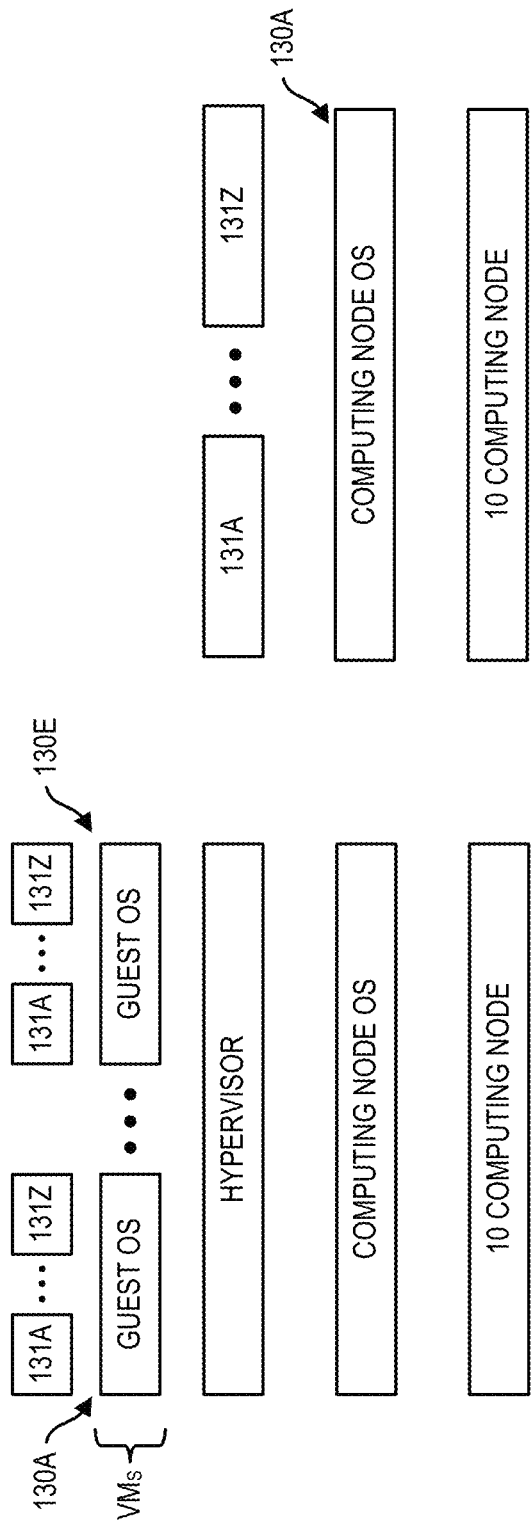

DISTRIBUTED CONTAINER IMAGE REPOSITORY SERVICE

BACKGROUND

One method for virtualization is container based virtualization in which container virtual machines are deployed. Container-based virtualization, also called operating system virtualization, is an approach to virtualization in which the virtualization layer runs as an application within an operating system. In this approach, the operating system's kernel can run on a physical computing node with several isolated application environments installed on top of it. The isolated guest application environments are called containers.

Isolation between the containers occurs at multiple resources, such as at the file-system, the network stack subsystem, and one or more namespaces, but not limited thereto. By sharing the same running kernel and memory space there is virtually no difference between the performance of the "host" operating system and the containers.

This method of virtualization is significantly different from the traditional virtualization technology involving traditional hypervisor based virtual machines (VMs) where a physical computing node is emulated using a software emulation layer.

A container image can be formed using a set of one or more layers. For example, a container image may include one layer for modifying the operating system to a specific version or specific customization—e.g., apply UBUNTU® 14.04 binary to the underlying LINUX® operating system (UBUNTU® is a registered trademark of Canonical Ltd. and LINUX® is a registered trademark of Linus Torvalds). Another layer might include configuration data for the operating system customization—e.g., UBUNTU® configuration. Another layer might apply or remove updates to the modified operating system—e.g., apply UBUNTU® system updates. Another layer might include an application to be configured in the container—e.g., the binaries of an application server; another layer might include the configuration data of the application server. Another layer can specify a webservice. Another layer can specify a development platform. Another layer might include the binary or other data of a user application that is to be executed using the container. Another layer might include a set of environment variables that is needed to successfully operate the application server, the user application, or both on the container; and so on. Many different types of layers can be similarly configured in a container image, and any number of layers can be configured in a container image to create a container.

Container based virtualization technology offers higher performance and less resource footprint when compared to traditional virtualization, and has become an attractive way for cloud vendors to achieve higher density in the datacenter. Thus, containerization (i.e., operating a virtualized data processing environment using container-based virtualization) is changing how workloads are being provisioned on cloud infrastructure.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: receiving, by a first container host node, container image configuration data, the container image configuration data referencing a plurality of images; determining, by the first container host node, that a first image of the plurality of images is not available at the first container host node; responsive to the determination that the first image of the plurality of images is not available at the first container host node, multicasting, by the first container host node, to the set of peer container host nodes of the first container host node, a request for the first image; responsive to the multicasting of the request, receiving, by the first container host node, from the second container host node, the first image; building, by the first container host node, a container image according to the container image configuration data, the building including using the first image received from the container host node; and instantiating, by the first container host node, a container from the container image.

In another aspect, a computer program product can be provided. The computer program product can include a computer readable storage medium readable by one or more processing circuit and storing instructions for execution by one or more processor for performing a method. The method can include, for example: receiving, by a first container host node, container image configuration data, the container image configuration data referencing a plurality of images; determining, by the first container host node, that a first image of the plurality of images is not available at the first container host node; responsive to the determination that the first image of the plurality of images is not available at the first container host node, multicasting, by the first container host node, to the set of peer container host nodes of the first container host node, a request for the first image; responsive to the multicasting of the request, receiving, by the first container host node, from the second container host node, the first image; building, by the first container host node, a container image according to the container image configuration data, the building including using the first image received from the container host node; and instantiating, by the first container host node, a container from the container image.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a first container host node, container image configuration data, the container image configuration data referencing a plurality of images; determining, by the first container host node, that a first image of the plurality of images is not available at the first container host node; responsive to the determination that the first image of the plurality of images is not available at the first container host node, multicasting, by the first container host node, to the set of peer container host nodes of the first container host node, a request for the first image; responsive to the multicasting of the request, receiving, by the first container host node, from the second container host node, the first image; building, by the first container host node, a container image according to the container image configuration data, the building including using the first image received from the container host node; and instantiating, by the first container host node, a container from the container image.

Shortcomings of the prior art are overcome, and additional advantages are provided, through the provision, in one aspect, of a method. The method can include, for example: obtaining, by a container host node, container image configuration data that defines a specified container image configuration, the specified container image configuration referencing first through Nth container images that define layers of the specified container image configuration, wherein the container host node includes an associated container image repository for storing container images; multicasting, by the container host node, a request for one or more image of the first through Nth container images to a set of container host nodes, wherein each container host node of the set of container host nodes is a peer container host node of the container host node, wherein each container host node of the set of container host nodes is configured to launch containers and wherein each container host node of the set of container host nodes has a container image repository associated thereto for storing container images; receiving, by the container host node, at least one container image from at least one container host node of the set of container host nodes in response to the multicasting; building, by the container host node, a specified container image according to the specified container image configuration using the at least one container image received by the receiving; and running, by the container host node, the specified container image built by the building to define a runtime container.

In another aspect, a computer program product can be provided. The computer program product can include a computer readable storage medium readable by one or more processing circuit and storing instructions for execution by one or more processor for performing a method. The method can include, for example: obtaining, by a container host node, container image configuration data that defines a specified container image configuration, the specified container image configuration referencing first through Nth container images that define layers of the specified container image configuration, wherein the container host node includes an associated container image repository for storing container images; multicasting, by the container host node, a request for one or more image of the first through Nth container images to a set of container host nodes, wherein each container host node of the set of container host nodes is a peer container host node of the container host node, wherein each container host node of the set of container host nodes is configured to launch containers and wherein each container host node of the set of container host nodes has a container image repository associated thereto for storing container images; receiving, by the container host node, at least one container image from at least one container host node of the set of container host nodes in response to the multicasting; building, by the container host node, a specified container image according to the specified container image configuration using the at least one container image received by the receiving; and running, by the container host node, the specified container image built by the building to define a runtime container.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining, by a container host node, container image configuration data that defines a specified container image configuration, the specified container image configuration referencing first through Nth container images that define layers of the specified container image configuration, wherein the container host node includes an associated container image repository for storing container images; multicasting, by the container host node, a request for one or more image of the first through Nth container images to a set of container host nodes, wherein each container host node of the set of container host nodes is a peer container host node of the container host node, wherein each container host node of the set of container host nodes is configured to launch containers and wherein each container host node of the set of container host nodes has a container image repository associated thereto for storing container images; receiving, by the container host node, at least one container image from at least one container host node of the set of container host nodes in response to the multicasting; building, by the container host node, a specified container image according to the specified container image configuration using the at least one container image received by the receiving; and running, by the container host node, the specified container image built by the building to define a runtime container.

Shortcomings of the prior art are overcome, and additional advantages are provided, through the provision, in one aspect, of a method. The method can include, for example: receiving, by a container host node, from a requesting peer container host node a request for one or more container image referenced in a specified container image configuration that references first through Nth container images that define layers of the specified container image configuration; responding, by the container host node, to the request with performance metric data specifying performance metrics of the container host node; receiving, by the container host node, an image pull request from the requesting peer container host node, the image pull request including an image pull request for a certain container image stored on a container image repository associated to the container host node; and sending, by the container host node, the certain container image to the requesting peer container host node.

In another aspect, a computer program product can be provided. The computer program product can include a computer readable storage medium readable by one or more processing circuit and storing instructions for execution by one or more processor for performing a method. The method can include, for example: receiving, by a container host node, from a requesting peer container host node a request for one or more container image referenced in a specified container image configuration that references first through Nth container images that define layers of the specified container image configuration; responding, by the container host node, to the request with performance metric data specifying performance metrics of the container host node; receiving, by the container host node, an image pull request from the requesting peer container host node, the image pull request including an image pull request for a certain container image stored on a container image repository associated to the container host node; and sending, by the container host node, the certain container image to the requesting peer container host node.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, by a container host node, from a requesting peer container host node a request for one or more container image referenced in a specified container image configuration that references first through Nth container images that define layers of the specified container image configuration; responding, by the container host node, to the request with performance metric data specifying performance metrics of the container host node; receiving, by the container host node, an image pull request from the requesting peer container host node, the image pull request including an image pull request for a certain container image stored on a container image repository associated to the container host node; and sending, by the container host node, the certain container image to the requesting peer container host node.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1B is a system block diagram illustrating an architecture for hosting a container according to one embodiment;

FIG. 1C is a system block diagram illustrating an architecture for hosting a container according to one embodiment;

DETAILED DESCRIPTION

Figure 1A:
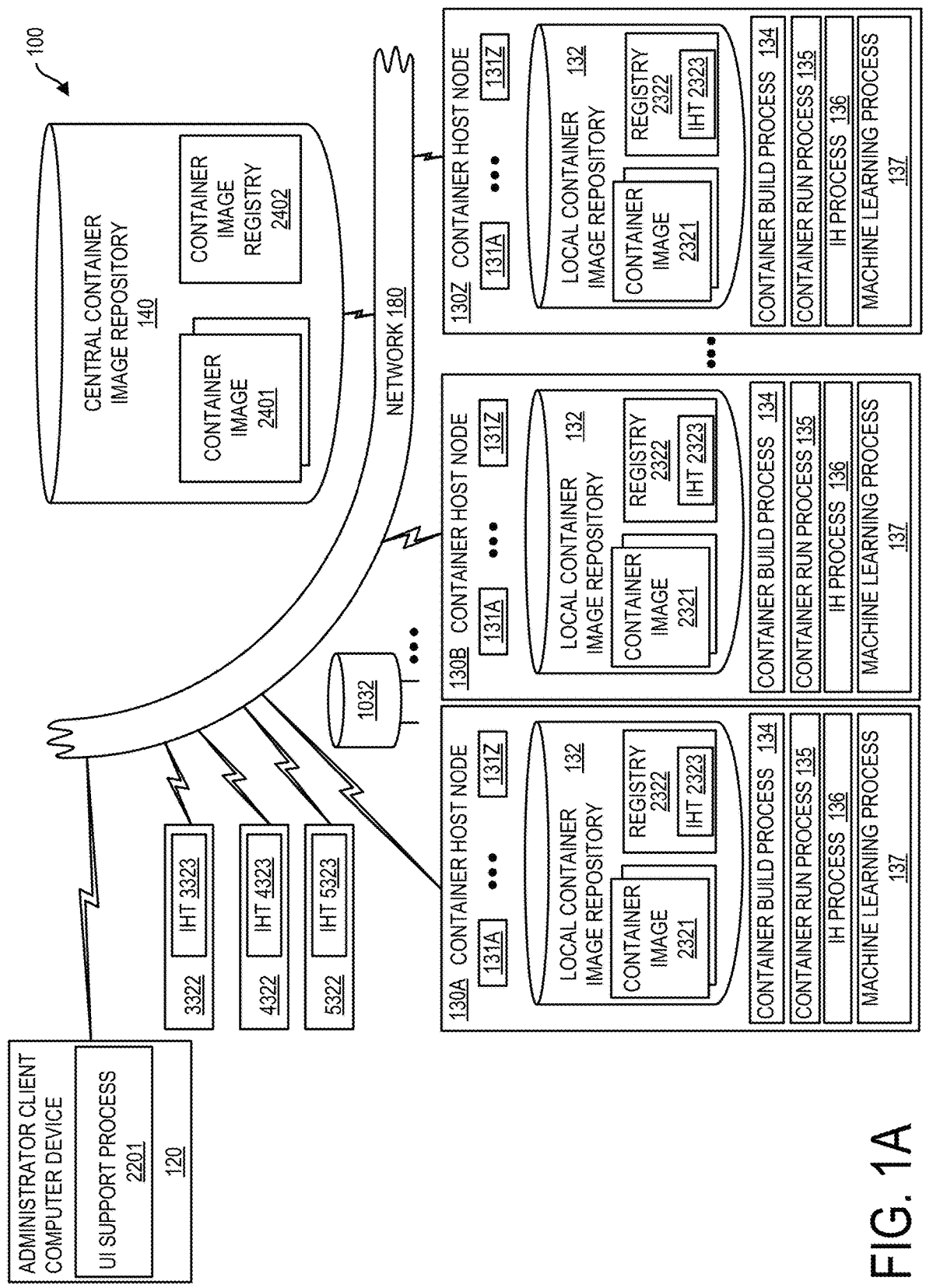
FIG. 1A is a system block diagram illustrating a system having a plurality of container host nodes according to one embodiment.

System 100 for use in launching containers is set forth in one embodiment in FIG. 1A. System 100 in one embodiment can include a plurality of container host nodes 130A-130Z, in communication with one another via network 180. System 100 according to one embodiment can also include administrator client computer device 120 and/or central container image repository 140. Container host nodes 130A-130Z, administrator client computer device 120, and central container image repository 140 can be in communication with one another via network 180 according to one embodiment. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

In one embodiment, each of container host nodes 130A-130Z can be external to one another, e.g. located on different computing nodes, e.g. different physical computing nodes. In one embodiment container host nodes 130A-130Z, administrator client computer device 120, and central container image repository 140 can be external to one another. Regarding container host nodes as set forth herein, e.g. container host node 130A, a container host node can be provided, e.g. by a virtual machine running on a computing node or a computing node that is absent of a virtual machine. In some embodiments, a common computing node can host first and second virtual machines, e.g. VM1 and VM2. In such an embodiment container host node 130A can be provided by the first virtual machine, VM1, and container host node 130B can be provided by the second virtual machine, VM2, so that container host nodes 130A and 130B are commonly located on a single computing node but on different virtual machines hosted by the computing node. Container host nodes 130A-130Z can build and run container images to define runtime containers (containers) 131A-131Z.

Building and running of container images can be performed in accordance with administrator user defined configuration data defined by an administrator user using a displayed administrator user interface displayed on administrator client computer device 120. Administrator client computer device 120 can run a UI support process 2201, e.g. provided by a browser application to support display of a displayed administrator user interface.

Exemplary architectures for hosting containers are set forth in FIGS. 1B and 1C. As depicted in FIG. 1B, containers of containers 131A-131Z can be run on a container host node (e.g. container host node 130A or 130E) provided by a virtual machines (VM) e.g. a traditional virtual machine running on a hypervisor (potentially with other VMs), running on a computing node OS that runs on computing node 10 provided by a physical computing node as set forth herein. As depicted in FIG. 1B, containers of containers 131A-131Z can be run on a container host node e.g. container host node 130A provided by a computing node OS running on computing node 10 provided by a physical computing node as set forth herein.

In one embodiment central container image repository 140 and one or more container host node of container host nodes 130A-130Z can be provided in different physical environments. For example, central container image repository 140 can be located within a first data center and each container host node of container host nodes 130A-130Z can be located within a second data center, external to the first data center.

Embodiments herein recognize that there are performance problems associated with approaches for launching containers as practiced according to the current state of the art. According to the current state of the art approach, a container host node can request a multilayer container image from a central container image repository configured similar to central container image repository 140 as shown in FIG. 1A. For launching a container, a container host node can request a multilayer container image and a multilayer image can be received at the container host node from a central container image repository in response to the request, whereupon the container host node can install the multilayer container image and then run the multilayer container image. In such a scenario, the central container image repository can be configured to be accessible by multiple container host nodes.

Embodiments herein recognize various problems with the approach of the prior art, including slow deployment times, Deployment latency can become more severe where container image sizes increase and/or where there is a reduced connection bandwidth connection between a central container image repository and requesting container host node. Bandwidth reduction can occur, e.g. where multiple different container host nodes make simultaneous requests for container images on a common central container image repository.

For addressing problems including those of the prior art highlighted herein, container host nodes 130A-130Z as set forth in FIG. 1A, can be particularly configured. Each container host node 130A-130Z according to one embodiment can be configured to support one or more container 131A-131Z. In addition, each container host node of container host nodes 130A-130Z can run a container build process 134, for building a container image, a container run process 135 to run a built container image to define a runtime container, an image hash (IH) process 136 to hash a container image for return of a container image hash ID. One or more process performed by a container host node can define a machine learning process 137, wherein a provided output adapts over time based on input training data without being expressly programmed. Isolation between the containers 131A-131Z can occur at multiple resources, such as at the file system, the network stack subsystem, and one or more namespaces, but not limited thereto. By sharing the same running kernel and memory space there is virtually no difference between the performance of the "host" operating system and the containers.

Each container host node of container host nodes 130A-130Z can have associated executable code and libraries for supporting running of container build process 134, container run process 135 and IH process 136. According to another aspect, each container host node of container host nodes 130A-130Z can include a local container image repository 132. Local container image repository 132 of each container host node 130A-130Z can include container image area 2321 storing container images. Each local container image repository 132 can further include container image registry 2322 having an image hash table (IHT) 2323. Image registry 2322 can store data descriptive of container images stored in container image area 2321. Container image registry 2322 can store data specifying e.g. a list of container images stored in container image area 2321, system memory locations of container images stored in container image area 2321, sample container build files and build file commands associated to prior built container image, logs of prior building of container images and the like. Container images stored in container image area 2321 can include single layer container images and/or multiple layer container images. IHT 2323 can be a table that associates container image IDs to container image hash IDs and timestamps for the various container images. In the case a container host node is hosted according to the architecture described in reference to FIG. 1B, the local container image repository 132 can be provided by a virtualized system memory running on a hypervisor. In the case a container host node is hosted according to the architecture described in reference to FIG. 1C, the local container image repository 132 can be provided by a system memory of computing node 10 provided by a physical computing node.

In some embodiments, system 100 can include a floating volume shared container image repository 1032 for storing container images that are shared between first, second and up to M container host nodes. The M container host nodes can be e.g. container host nodes provided by hypervisor based VMs hosted on a common computing node 10 provided by a physical computing node (FIG. 1B architecture). In the illustrative embodiment of FIG. 1A, container host node 130A and container host node 130B can share shared container image repository 1032. In one embodiment, container host node 130A and container host node 130B can be provided by VMs hosted on a common computing node 10 provided by a physical computing node (FIG. 1B architecture), and shared image repository 1032 can be provided on a system memory of the computing node 10. System 100 can be configured according to one embodiment so that data written to a local container image repository 132 of a certain container host node is automatically written to a shared container image repository 1032 associated to that certain container host node. System 100 can be configured according to one embodiment so that a certain container host node having an associated shared container image repository 1032 iteratively e.g. at defined intervals, its content to its associated shared container image repository.

System 100 can include one or more additional container image registries storing information on available container images available for downloading. For example, each container host node of container host nodes 130A-130Z which in one embodiment can be provided by VMs running on computing nodes 10 provided by physical computing nodes hosting more than one VM can iteratively push its container registry data to a container image registry associated to its host computing node 10 to define a set of host computing node container image registries including representative host node associated container image registry 3322 having associated IHT 3323. In one embodiment, image registry 3322 can be included in shared image repository 1032 and can store descriptive data including IHT data descriptive of container images of shared container image registry 1032.

In one embodiment, each registry of host computing node associated container image registries including registry 3322 can iteratively push its container image registry data to a container image registry associated to its physical network and/or cluster to define a set of container image registries including representative physical network or cluster associated registry 4322 having IHT 4323. Each registry of physical network or cluster associated image registries including registry 4322 can iteratively push its container image registry data to a container image registry associated to its data center to define a set of data center registries including representative data center registry 5322 having IHT 5323. Referring to FIG. 1A, container host node 130A can be associated to each of computing node registry 3322, physical network or cluster registry 4322 and data center registry 5322.

Referring to further aspects of system 100, central container image repository 140 can include container image area 2401 and container image registry 2402. Container image area 2401 can include a plurality of container images. Container images stored within central container image repository 140 can include an executable package provided by a piece of software that includes code run time, system tools, system libraries, and settings. Container image registry 2402 can include data on container images stored in container image area 2401. Container image registry 2402 can store data specifying e.g. a list of container images stored in container image area 2401, and data on the system memory locations of container images stored in container image area 2401. Container image area 2401 can include one or more container image database and in one embodiment can store container images made available from different, sources, e.g. a first OS modification layer provided by UBUNTU® or a second OS modification layer provided by CENTOS® (CENTOS® is a registered trademark of Red Hat, Inc.). Container images stored in container image area 2401 can be provided e.g. by single layer (layer specific) container images or multiple layer container images comprising multiple layers. In the building of new container images, single layer container images can be referenced for compositing with other single layer container images, or with multiple layer container images to define new container images. Multiple layer container images stored in a database of container image area 2401 of central container image repository 140 can include custom container images custom authored by administrator users of system 100. Such custom authored container images can be custom authored to provide any arbitrary service. Central container image repository 140 can be a dedicated container image repository according to one embodiment.

Referring to system 100, local container image repository 132 of container host nodes 130A-130Z can define distributed storage areas for storing container images. Distributed storage provided by container host nodes 130A-130Z can reduce I/O intensive data requests associated with alternative approaches, to reduce bottlenecking associated with simultaneous requests for container images from multiple sources.

According to one embodiment, each local container image repository 132 can include a subset of content of container images stored in central container image repository 140. Subset content of each respective local container image repository 132 can be differentiated between the local container image repository 132 of the respective container host nodes 130A-130Z. In some embodiments, respective container host nodes 130A-130Z can store container image content not stored in central container image repository 140. According to one embodiment, system 100 can be configured so that when container host nodes 130A-130Z build a container image for running of a container, the content of the built container image is available for requesting and transmission to peer container host nodes. Such content can be made available on a per layer basis.

Figure 2:
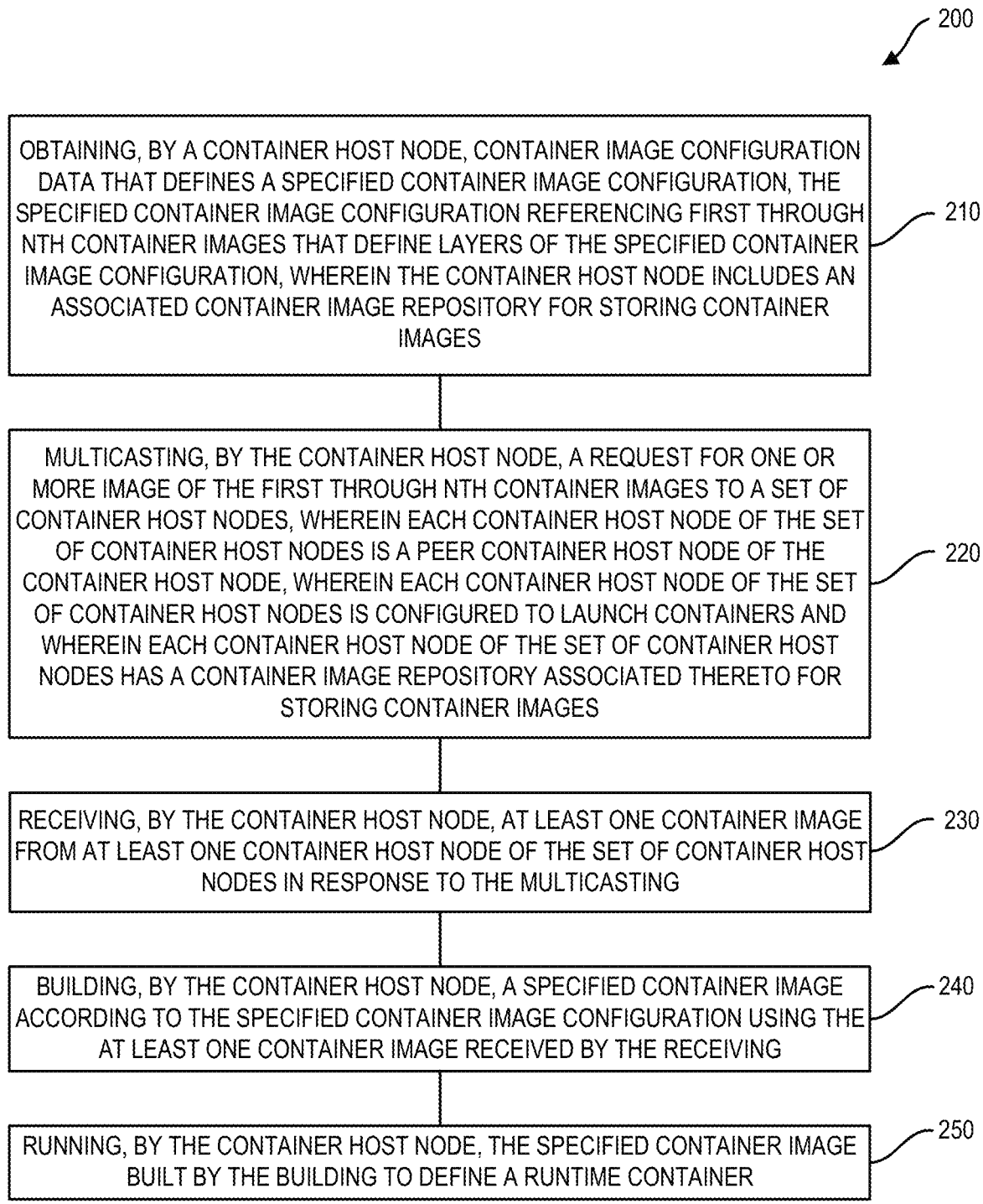
FIG. 2 is a method that can be performed by a system according to one embodiment.

A method 200 that can be performed by system 100 is illustrated in FIG. 2. At block 210, method 200 can include obtaining, by a container host node, container image configuration data that defines a specified container image configuration, the specified container image configuration referencing first through Nth container images that define layers of the specified container image configuration, wherein the container host node includes an associated container image repository for storing container images. At block 220, method 200 can include multicasting, by the container host node, a request for one or more image of the first through Nth container images to a set of container host nodes, wherein each container host node of the set of container host nodes is a peer container host node of the container host node, wherein each container host node of the set of container host nodes is configured to launch containers and wherein each container host node of the set of container host nodes has a container image repository associated thereto for storing container images. At block 230, method 200 can include receiving, by the container host node, at least one container image from at least one container host node of the set of container host nodes in response to the multicasting. At block 240, method 200 can include building, by the container host node, a specified container image according to the specified container image configuration using the at least one container image received by the receiving. At block 250, method 200 can include running, by the container host node, the specified container image built by the building to define a runtime container.

Figure 3A:
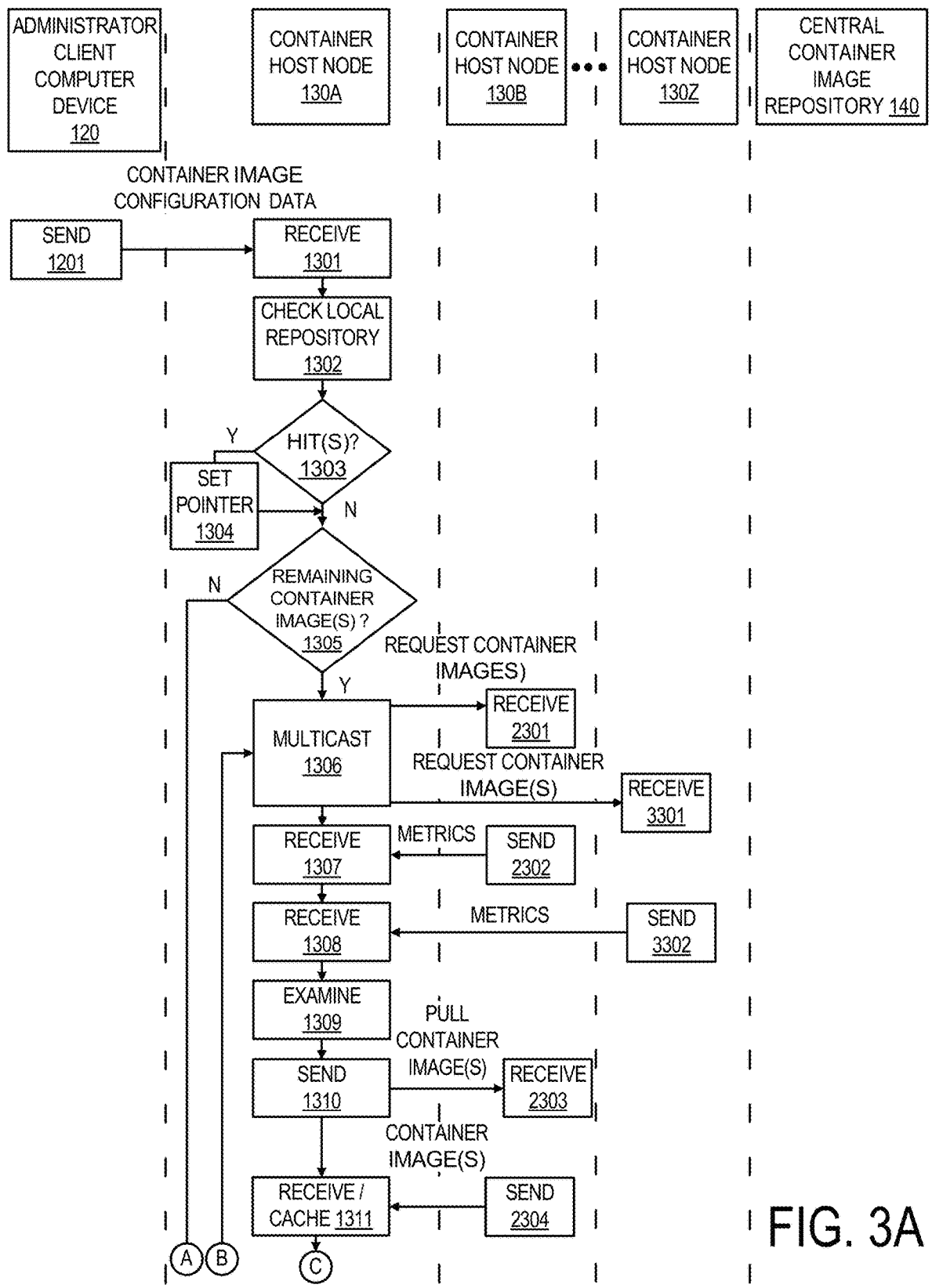
FIGS. 3A-3B is a flowchart depicting a method that can be performed by a container host node interoperating with other container host nodes according to one embodiment.
Figure 3B:
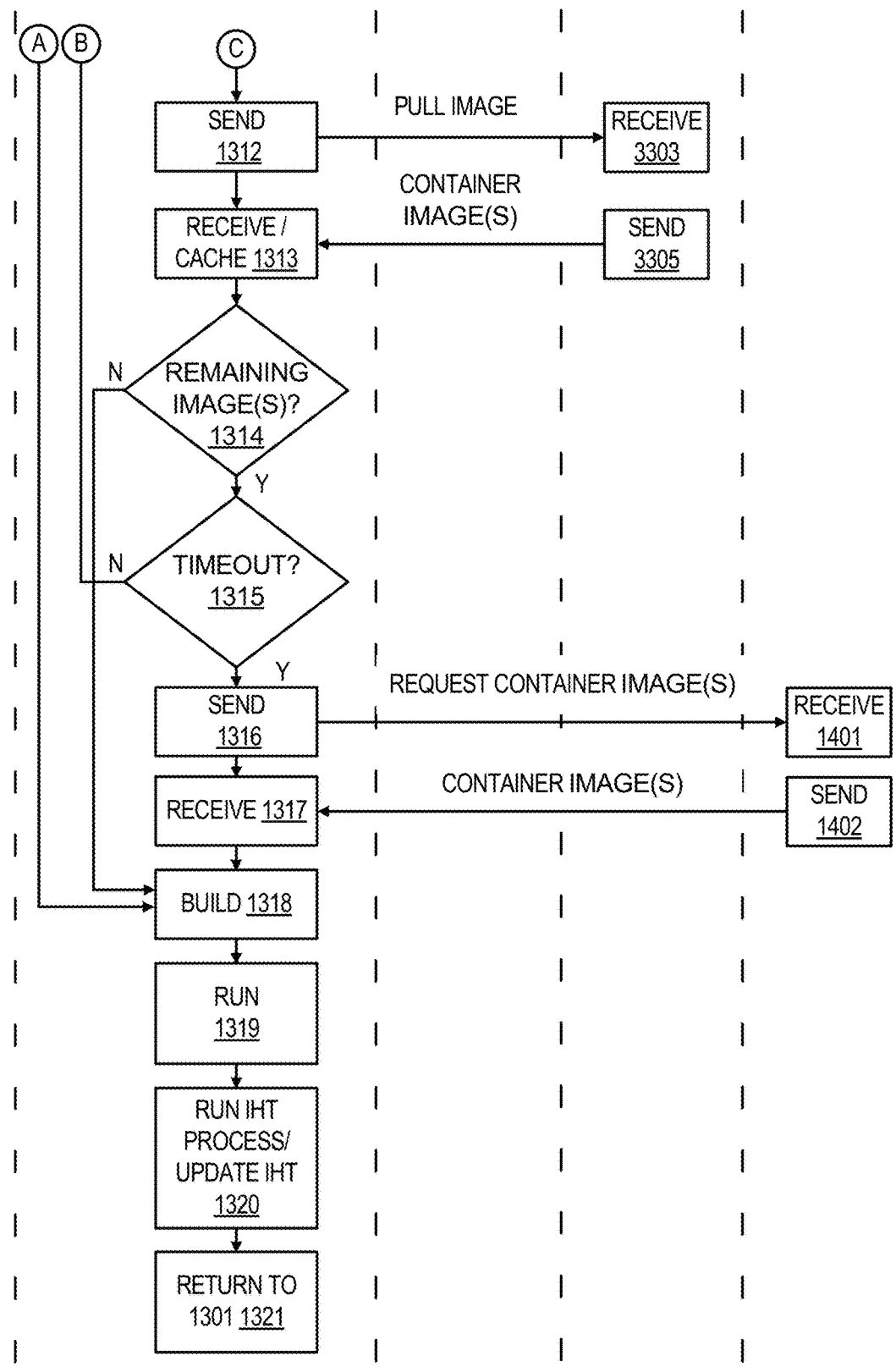

An example of method 200 is set forth with reference to the flowchart of FIGS. 3A-3B illustrating functions of container host node 130A interoperating with administrator client computer device 120, container host node 130B, container host node 130Z, and central container image repository 140. At block 1201, administrator client computer device 120 can send container image configuration data for receipt by container host node 130A at block 1301.

Figure 4:
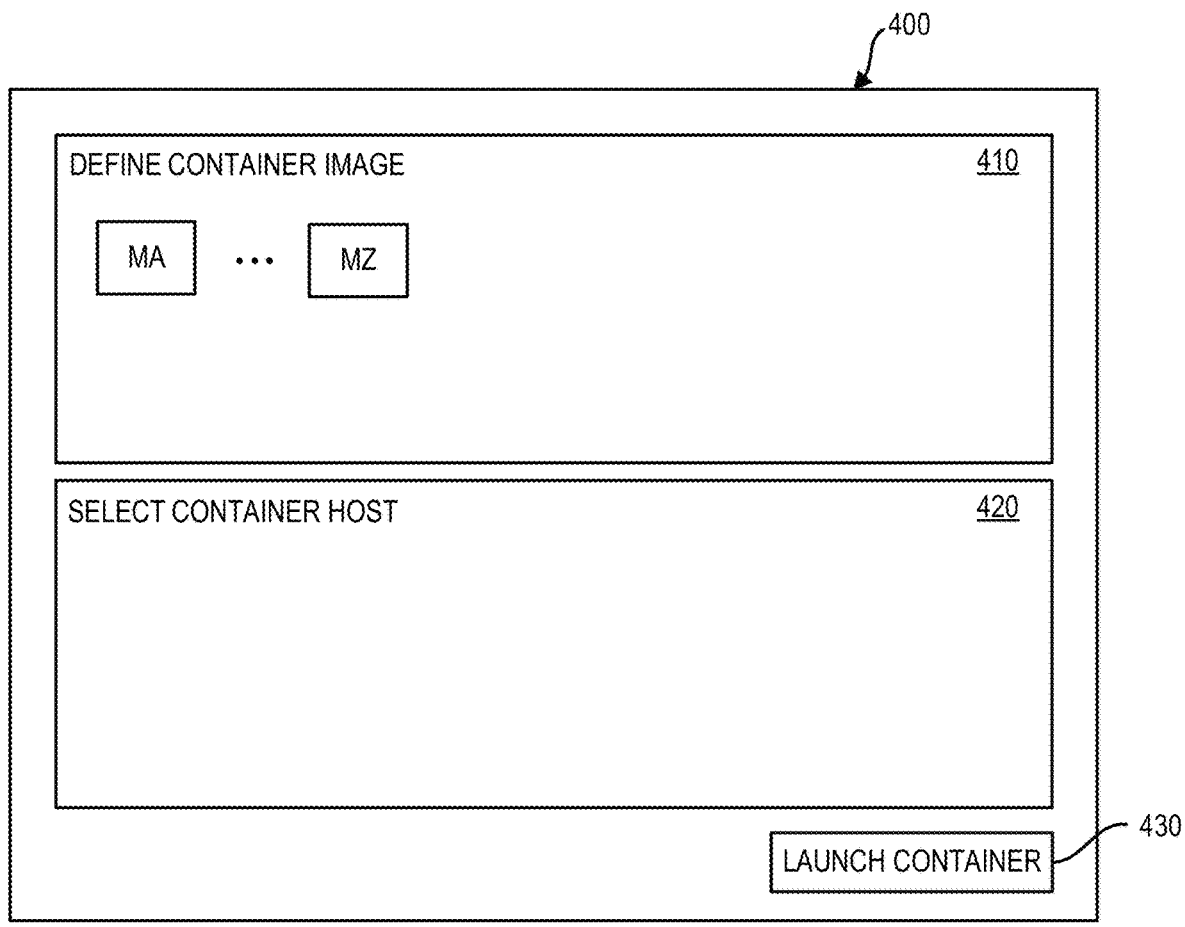
FIG. 4 depicts an administrator user interface according to one embodiment.

An administrator user can define container image configuration data using an administrator user interface 400 as set forth in FIG. 4. Administrator user interface 400 can include area 410 for use in defining container image configuration data that specifies layer attributes of a container to be built on a selected container host node. For defining container using area 410 an administrator user can for example use area 410 to author a text based build file which includes commands for building a container image. In the case a DOCKER® container platform is used, the text based build file can be provided by a "DOCKER® file" (DOCKER® is a registered trademark of Docker, Inc.). Area 410 can permit an administrator user e.g. to paste in previously authored commands and edit such commands or sets of commands.

In authoring a text based build file using area 410 an administrator user can be presented menu indicators MA-MZ depicting container images available from central container image repository 140, which can be in communication with administrator client computer device 120. Indicators MA-MZ can indicate single layer (layer specific) container images (e.g. UBUNTU® OS modification layer image or CENTOS® OS modification layer image) and or multiple layer container images (e.g. custom authored container images for particular services). In authoring a build file, an administrator user can specify a sequence of commands wherein each command creates a layer. An example build file is illustrated in Table A.

TABLE A

```
FROM ubuntu: 16.04
RUN apt-get install nginx
RUN apt-get install tomcat
COPY configfiles/tmp
WORKDIR/path/to/tomcat
CMD ["/bin/bash", "-c", "service start tomcat"]
```

The container image build file of Table A includes six commands, each of which creates a layer. The FROM statement starts out by creating a layer from the "ubuntu 16.04" container image. The container image "ubuntu 16.04" can refer to a layer specific image stored on central container image repository 140. The first and second RUN statements install "nginx" and "tomcat" layers respectively. The COPY command adds files from a local directory. The WORKDIR statement sets a working directory for an ensuing CMD statement and the CMD statement builds a custom application. A container image built using the container image build file of table A is illustrated graphically in FIG. 5 (image file ID IA001).

In authoring a build file, an administrator user can specify a sequence of commands wherein each command creates a layer. Another example container image build file is illustrated in Table B.

TABLE B

FROM ubuntu: 16.04
RUN apt-get install jetty
RUN apt-get install tomcat
COPY configfiles/tmp
WORKDIR/path/to/tomcat
CMD ["bin/bash", "-c", "service start tomcat"]

The container image build file of Table A includes six commands, each of which creates a layer. The FROM statement starts out by creating a layer from the "ubuntu 16.04" container image (alternatively, another FROM statement such as "FROM centos 10.02" would establish an alternative base layer). The container image "ubuntu 16.04" can refer to layer specific image stored on central container image repository 140. The first and second RUN statements install "jetty" and "tomcat" layers respectively. The COPY command adds files from a local directory. The WORKDIR statement sets a working directory for an ensuing CMD statement and the CMD statement builds a custom application. A container image built using the container image build file of table B is illustrated graphically in FIG. 5 (image file ID IA00N).

A container image according to one embodiment can include an ordered collection of root file system changes and the corresponding execution parameters for use within a container runtime. A container image according to one embodiment can include a union of layered file systems stacked on top of each other. A container image according to one embodiment may not have state and may not change. A layer according to one embodiment can include a DIFF file set relative to a parent layer. A DIFF file set defining a layer can include according to one embodiment content modifying a parent layer, e.g. by addition, updating or deleting. A DIFF file set defining a layer can include according to one embodiment content modifying a parent layer e.g. adding first new files F1, updating content of second files F2 of a parent layer, deleting third files F3 of a parent layer.

In one embodiment, an administrator user can use area 410 of administrator user interface 400 (FIG. 4) to author a container image build file, e.g. a container image build file having a single command that references a multilayer container image stored in central container image repository 140. The multilayer container image can be e.g. a multilayer container image custom authored for use in support of a particular service. In one embodiment, an administrator user can use area 420 of administrator user interface 400 (FIG. 4) to specify a container host node of container host nodes 130A-130Z on which a container image is to be built and/or run.

Figure 5:
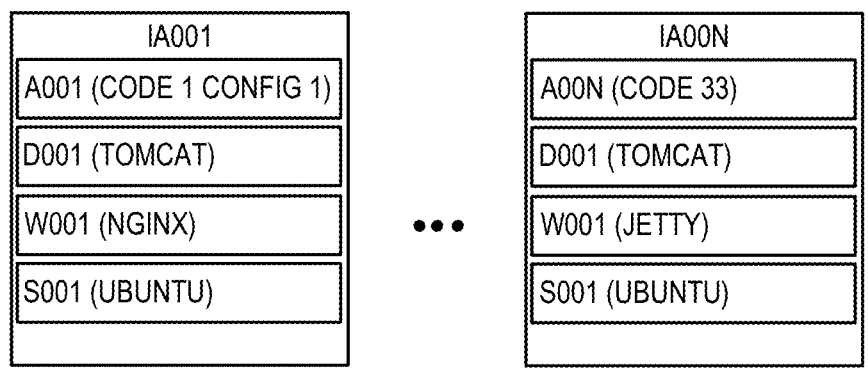
FIG. 5 depicts a structure for a plurality of container images that can be launched on a container host node according to one embodiment.

An administrator user using administrator user interface 400 can activate container image building and/or running a container image on a selected container host using, e.g. control 430. Container image configuration data sent at block 1201 can include text data defining a container image build file. Such container image build file can reference one or more container image previously built and stored by system 100. Example container image structures that can be defined by a container image build file are illustrated in FIG. 5. The container image identified by the identifier IA001 can have the structure UBUNTU-NGINX-TOMCAT-CUSTOM CODE. The container image identified by identifier IA00N can have the container image structure UBUNTU-JETTY-TOMCAT-CUSTOM CODE. More specifically the container image specified by the identifier IA001 (FIG. 5) have the image structure specified as follows: layer 1 image specified by the identifier S001, layer 2 image specified by the identifier W001, layer 3 image specified by the identifier D001, and layer 4 image specified by the identifier A001. According to one embodiment, the layer identifier S001 can specify the operating system modification UBUNTU®, W001 can specify the webservice NGINX® (NGINX® is a registered trademark of Nginx Software, Inc.), D001 can specify the development platform TOMCAT® (TOMCAT® is a registered trademark of Apache Software Foundation), and A001 can specify custom application layer code. Referring to the container identified by identifier by IA00N (FIG. 5), the container identified by identifier IA00N can include: layer 1 provided by the layer image having the identifier S002, layer 2 having an identifier specified by layer ID W002, layer 3 specified by the identifier D001, and layer 4 provided by a layer having an identifier A003. In the described example, layer ID S002 can specify the OS modification layer CENTOS®, W002 can specify the webservice layer JETTY® (JETTY® is a registered trademark of the Eclipse Foundation), D001 can be a layer ID for the development platform TOMCAT®, and A003 can be a layer ID for custom application code.

In response to receiving container image configuration data at block 1301, container host node 130A can proceed to obtain previously built container images that are referenced in a container image build file. For obtaining previously built and stored container images referenced in a container image build file, container host node 130A can initially request container image(s) from container host node 130A and can then request container image(s) from one or more peer container host nodes 130B-130Z and can then request container image(s) from central container image repository 140. Where container host node 130A builds a container image specified in container build file without requesting container image(s) from central container image repository 140 system 100 operates in a masterless mode of operation.

Container host node 130A at block 1302 can check contents of local container image repository 132 of container host node 130A for previously built container images referenced in the container image configuration data received at block 1301. Embodiments herein recognize that container image repository 132 of container host node 130A can include container images previously installed on container host node 130A, e.g. in response to previously run container image build files for use in supporting previously run containers and/or currently run containers. The performing of checking local container image repository 132 at block 1302 can include using the container image configuration data received at block 1301, which data can include identifiers of previously built containers. On the identification of one or more hits (container images stored in local container image repository 132 of container host node 130A matching listed container image layer identifiers of the container image configuration data received at block 1301) container host node 130A can set one or more pointer to the identified container images of local container image repository 132 of container host node 130A at block 1304. On the setting of one or more pointer container host node 130A can proceed to block 1305. On the identification of no hits at block 1303, container host node 130A can proceed to block 1305 without setting of any pointer.

At block 1305, container host node 130A can determine whether there are additional referenced container images to be obtained out of the set of referenced previously built container images referenced in the container image configuration data received at block 1301. If no (meaning that all of the referenced container images were available locally on local container image repository 132) container host node 130A can proceed to block 1318 to build the specified container image defined by configuration data received at block 1301.

On the determination by container host node 130A at block 1305 that additional one or more container layers remain for obtaining, container host node 130A can proceed to block 1306 to multicast a request for remaining layers of a specified container specified by the container image configuration data received at block 1301. The multicast request can be received peer container host nodes of container host nodes 130B-130Z e.g. by container host node 130B at block 2301 and by container host node 130Z at block 3301. It will be understood that the multicast request can be sent to additional container host nodes of container host nodes 130B-130Z, e.g. each peer container host node of peer container host nodes 130B-130Z according to one embodiment.

At blocks 2301 and 3301, in response to the multicast request sent at block 1306 container host nodes e.g. container host nodes 130B and 130Z respectively, can determine whether a remaining container image referenced in container image configuration data received at block 1301 is stored locally therein on its respective local container image repository 132. The container host nodes 130B and 130Z respectively, can for example match a container image referenced in the received container image configuration data received at block 1301 to a container image identifier of a container image stored locally on a container image area 2321 of local container image repository 132 of a peer container host node.

For determining that a container image of a peer container host node matches a referenced container image referenced in container image configuration data received at block 1301 container host node 130A can apply one or more matching criterion. One criterion can be, for example, that the container image of the peer container host node has a container ID matching the container ID of the referenced container image referenced in container image configuration data received at block 1301. Another criterion can be that the container image of the peer container host node is a current version of the container image.

Embodiments herein recognize that container images may be regularly updated within system 100. System 100 can be configured so that current images are included in newly built container images. For container image versioning control, system 100 can include within registries 2322 of local container image repositories 132 IHTs 2323. Embodiments herein recognize that updated versions of container images can be regularly made available in central container image repository 140 e.g. by the providers of such container images or by a container image repository service provider. In one embodiment, system 100 can be configured so that when a given container host node of container host nodes 130A-130Z receives a container image from central container image repository 140, the receiving container host node activates IHT process 136 to hash the received container image to return a container image hash ID. The receiving container image hash ID can be written to IHT 2323 of the receiving container host node to update the IHT 2323.

Table B depicts an image hash table (IHT) 2323 stored on local container image repository 132 of a container host node such as container host node 130B. Table B illustrates an IHT for image S001 and image W001 which are container images referenced in the container image identified by identifier IA001 (FIG. 5).

TABLE C

| Container Image ID | Container Image Hash ID | Timestamp |
|---|---|---|
| ubuntu:14.04 | hye6ejdg48517fgk****** | 1505013122 |
| ubuntu:14.04 | p5y4xtn46169ehr****** | 1506019144 |
| mysql:client | jd73jkr85k79khld****** | 1505013236 |
| . . . | . . . | . . . |

For each container image stored into an IHT (Table B) specified with a container ID there can be associated to image hash ID and a timestamp. As seen in Table A an IHT over time in response to various updates can include more than one container image hash ID for each container image ID. A container image can be subject to an image hash processing to return a different container image hash ID in the case a new version of the container image is downloaded to a container host node of container host nodes 130A-130Z.

Continuing with the described example, a multicast request by container host node 130A at block 1306 can specify the container image having the container image ID "ubuntu 14.04" as a remaining container image for obtaining. Container host node 130B can determine that the container image specified in the first two rows of Table C is matching according to a first criterion based on these identified containers having a common container image ID. However, applying a second matching criterion, container host node 130B can exclude and filter out the container image indicated in the first row of Table C based on that specified container image being an older version of the container image. Container host node 130B can determine that the row 2 specified container image of Table B is a newer version the container image based on row 1 and row 2 having mismatched container image hashtag IDs and based on the second row having a more recent timestamp than the first row.

System 100 can use IHT data in various ways to assure that container images included in newly built container images are sufficiently recent. According to a third matching criterion, a container image can be filtered out from a set of matching container images based on latest timestamp for the container image being aged beyond a threshold age. Container host node 130A can apply the second and/or the third matching criterion set forth herein at block 1303 wherein container host node 130A examines its local container image repository 132.

On the identification of a container image match, container host nodes e.g. container host nodes 130B and 130Z at blocks 2302 and block 3302 respectively, can send metrics for receipt by container host nodes 130B and 130Z at block 1307 and block 1308 respectively. The metrics can include metrics data, e.g. a timestamp specifying a time of sending of the multicast request sent at block 1306, time of the receipt of request by the relevant container host node, e.g. container host node 130B or container host node 130Z. Metrics can also include performance metrics of the responding peer container host node. Performance metrics can include such metrics as CPU utilization metrics, memory utilization metrics, and I/O loading metrics, and physical association level. Container host nodes e.g. container host nodes 130B and 130Z at blocks 2302 and 3302 with metrics data can send container image ID(s) that match container image ID of a request (a request can specify more than one container image ID), together with IHT data for the matched container ID e.g. the container mage hashtag ID and timestamp associated to the container image ID. Container host node 130A can use the received IHT data to filter out container images from a set of matching container images e.g. using the second matching criterion herein. For example, at blocks 1307 and 1308 container host node 130A can receive IHT data for several container images having container image IDs matching a container ID referenced in container image configuration data received at block 1301. Container host node 130A in response to the receiving IHT data can filter out one or more container images from a set of matching container images based on the one or more container images having image hashtag IDs mismatched to a returned container image hashtag ID having a more recent timestamp than the one or more container images.

At block 1309, container host node 130A in response to received metrics including metrics data received at block 1307 and 1308 can perform examining of received metrics data and responsively to the examining based on one or more criterion being satisfied send pull image requests for receipt by container host nodes e.g. container host nodes 130B and 130Z respectively at block 2303 and blocks 3303. The criterion can include the criterion that the pull request is sent to a container host node predicted based on the examining at block 1309 to be the lowest latency container host node out of container host nodes having container image(s) matching referenced container image(s) referenced in container image configuration data received at block 1301. In response to receiving a pull image request at block 2303, container host node 130B at block 2304 can send container image(s) to container host node 130A for receipt by container host node 130A at block 1311. On receiving container image(s) container host node 130A at block 1311 can cache the received container image(s). In response to receipt of a pull image request at block 3303, container host node 130Z at block 3305 can send container layer image(s) to container host node 130A for receipt by container host node 130A at block 1313. At block 1313 container host node 130A can receive and cache the received container image(s).

Container host node 130A for predicting a lowest latency peer container host node out of peer container host nodes 130B-130Z can apply Eq. 1 below for each candidate peer host node having container image(s) matching a referenced container image.

$$S=F1W1+F2W2+F3W3+F4W4+F5W5+F6W6 \quad \text{(Eq. 1)}$$

Where S is the predicted latency score (lower scores indicating shorter latency), F1-F6 are factors indicative of latency and W1-W8 are weights associated to the various factors. In the described example, F1 can be a delivery time factor (e.g. using the return metrics delivery latency), F2 can be a CPU utilization metrics factor, F3 can be a memory utilization factor, F4 is an I/O utilization factor, F5 is a physical association factor. According to factor F5, each peer host container node having a matching container image matching a referenced container image referenced in the configuration data received at block 1301 can be assigned a physical association level. Peer container host nodes having a high level of physical association to the requesting container host node can be assigned lower values under the factor (to yield a lower latency score, S) and peer container host nodes having a relatively low level of physical association to the requesting container host node can be assigned lower values under the factor. According to factor F6, container image registry 2322 can store historical download performance records for each peer container host node, e.g. including average container image download times in bits/second from each peer container host node. According to factor F6, candidate peer container host nodes that have better historical performance image download metrics can be assigned lower values according to the factor (to yield a lower latency score, S). According to factor F6, candidate peer container host nodes that have weaker historical performance image download metrics can be assigned higher values according to the factor (to yield a higher latency score, S).

Figure 6:
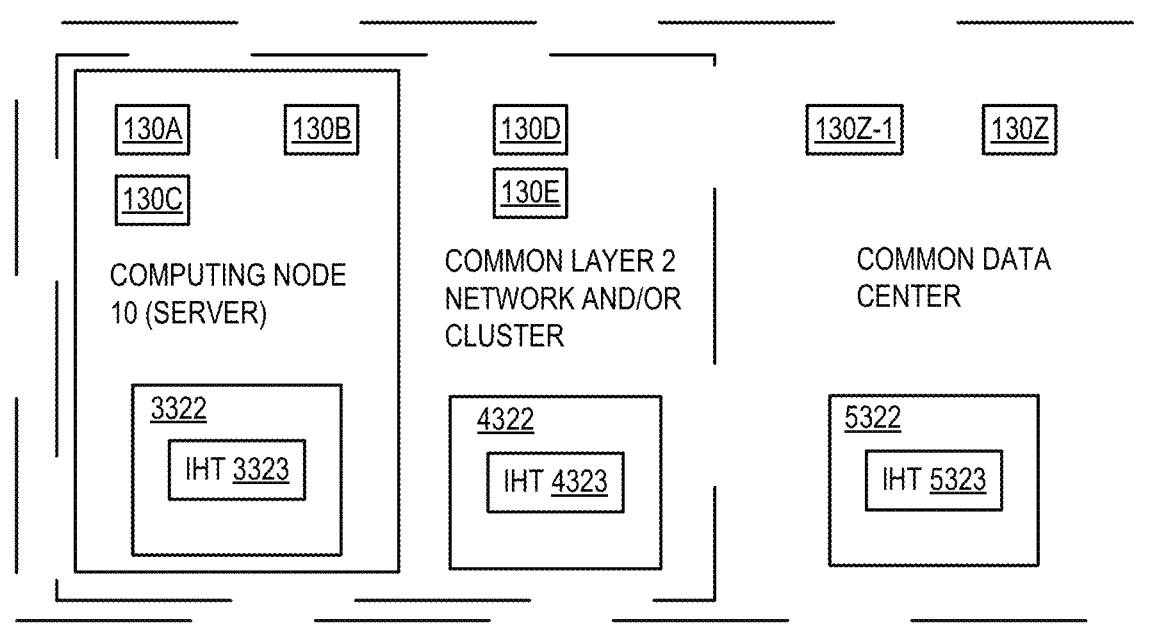
FIG. 6 depicts container host nodes located with different levels of physical association to a first container host node according to one embodiment.

Referring to FIG. 6, container host nodes 130B-130Z can have different levels of physical association to container host node 130A. For example, in reference to FIG. 6 container host nodes 130A-130C of container host nodes 130A-130Z can be hosted on a common computing node 10 provided by a physical computing node, e.g. a physical server. Further in reference to FIG. 6, container host nodes 130D and 130E of container host nodes 130A-130Z can be located on a computing node external to computing node 10 depicted in FIG. 6, but can be hosted on a common physical (i.e. layer 2) network and/or or a common cluster with container host nodes 130A-130Z. Further in reference to the example of FIG. 6, container host nodes 130Z-1 and 130Z can be hosted on one or more computing node external from computing node 10 depicted in FIG. 6 and on a physical network and cluster external to the physical network associated to container host nodes 130A-130E, but container host node 130Z-1 and container host node 130Z can nevertheless be physically associated to container host nodes 130A-130E by being located in a data center in common with container host nodes 130A-130Z.

In the described example of FIG. 6, container host nodes 130B and 130C can be regarded to have the highest level of physical association to container host node 130A. Container host nodes 130D and 130E can be regarded to have a next level of physical association to container host node 130A, i.e. a second level, and container host nodes 130Z-1 and 130Z can be regarded to have a third level of physical association to container host node 130A.

In one embodiment, container host node 130A at block 1306 can multicast requests for container images to all candidate peer container host nodes 130B-130Z. In one embodiment, system 100 can include features so that requests at block 1306 are multicast to a reduced and filtered set of candidate container host nodes. As explained with reference to FIG. 1A, each container host node of container host nodes 130A-130Z can iteratively push its container registry data to a container image registry associated to its host computing node 10 to define a set of host computing node container image registries including container image registry 3322. Each registry of host computing node container image registries including host computing node container image registry 3322 can iteratively push its container image registry data to a container image registry associated to its physical network and/or cluster to define a set of physical network or cluster container image registries including physical network or cluster container image registry 4322. Each registry the set of physical network or cluster container image registries including physical network or cluster container image registry 4322 can iteratively push its container image registry data to a container image registry associated to its data center to define a set of data center registries including data center container image registry 5322. The container image registries 3322, 4322, and 5322 can include pushed IHT data from IHTs 2323 of local container image repositories 132.

In one embodiment, container host node 130A prior to sending a multicast container image request at block 1306 can query its associated host computing node container image registry of 3322, and/or its associated physical network and/or cluster container image registry 4322, and/or its associated data center container image registry 5322. Container host node 130A can examine returned data including returned IHT data resulting from such query to perform pre-matching of container image(s) stored on local container image repositories of peer container host nodes 130A-130Z to container image(a) referenced in container image configuration data received at block 1301. For performing matching, container host node 130A can employ one or more of the first matching criterion (common container image ID), second matching criterion (current version), and/or third matching criterion (based on timestamp age) as set forth herein. In one embodiment in response to a pre-match returning no matches, container host node 130A can proceed to send the multicast request at block 1306 to all candidate container host nodes. Such action can be advantageous e.g. for the reason that local container image repositories 132 can include more recent data than their associated push registries to which they push container image registry data.

In some embodiments as set forth herein system 100 can include a shared container image repository 1032 shared between first and second and up to Mth container host nodes e.g. container host node 130A and container host node 130B or container host node 130B and container host node 130C as set forth in FIG. 1A. Shared container image repository 1032 can define a floating shared repository volume across a physical host. Where a physical host e.g. computing node 10 according the architecture of FIG. 1B (running a hypervisor that supports container host nodes provided by hypervisor based VMs) has an associated container image registry 3322 with an associated IHT 3323 that is associated to multiple container host nodes e.g. 130A and 130B, or 130B and 130C etc., the container image registry 3322 can be included in shared container image repository 1032 storing container images.

Where a peer container host node e.g. container host node 130B of container host nodes 130A-130Z having both a local container image repository 132 and a shared container image repository 1032 (which may be shared by container host node 130C for example) returns metrics, metrics returned by the peer container host node 130B at block 2302 of the flowchart of FIG. 3A-3B can include metrics data for each repository path associated to the peer container host node, e.g. the first repository path including local container image repository 132 and the second path including shared container image repository 1032. Container host node 130A can score the different repository paths separately using the scoring function of Eq. 1 and when container host node 110 returns a decision selecting peer container host node 130B as the container host node from which to pull container image(s), container host node 110 can specify a repository path with the container host node selection.

In some embodiments, a container host nodes e.g. container host node 130B and container host node 130C of container host nodes 130A-130Z can be absent of local container image repository 132 and can include shared container image repository 1032. In such an embodiment, container host node 130B and 130C can use container image layers downloaded in a floating volume defined by a shared container image repository shared across physical host without its own copy. Where a peer container host node e.g. container host node 130B of container host nodes 130A-130Z having a shared container image repository 1032 returns metrics, metrics returned by the peer container host node 130B at block 2302 of the flowchart of FIG. 3A-3B can include metrics data for the repository path including shared container image repository 1032. When container host node 130A returns a decision selecting peer container host node 130B as a container host node from which to pull container image(s), container host node 130A can specify the repository path including shared container image repository 1032.

In some embodiments, container host node 130A in the described scenario of FIG. 3A-3B can share a floating volume shared repository 1032 with one or more other container host node. In such embodiments, container host node 130A can either include or be absent of local container image repository 132. Where container host node 130A has an associated shared container image repository 1032 and includes local container image repository 132, performance of check local repository block 1302 can include container host node 130A checking content of local container image repository 132 and shared container image repository 1032. Where container host node 130A has an associated shared container image repository 1032 and is absent of local container image repository 132, performance of check local repository block 1302 can include container host node 130B checking content of shared container image repository 1032.

Figure 7:
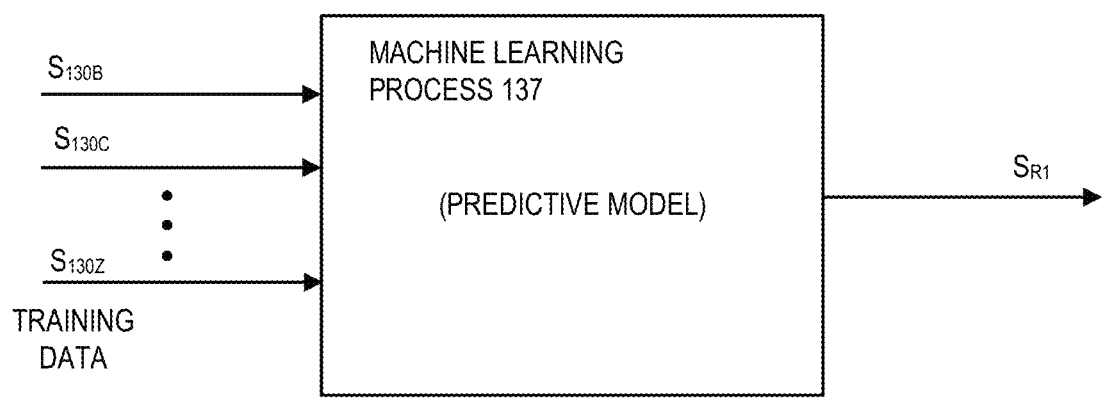
FIG. 7 depicts a machine learning process according to one embodiment.

Embodiments herein recognize that the described scoring process using the scoring function described in reference to Eq. 1 defines a machine learning process. Referring to FIG. 7 there is defined a machine learning process 137 wherein training data training the machine learning process 137 includes the parameters and values for the various factors used for return of a scoring value S130B-S130Z for candidate matching container images associated with each of several candidate peer container host nodes 130B-130B. Further in reference to FIG. 7, machine learning process 137 defines a predictive model wherein the predictive model is trained by the input training data to provide an output prediction as to the best performing candidate container image and associated container host node out of a set of candidate container images and associated candidate peer container host nodes. The predictive model updated by machine learning and trained by training data automatically adapts over time based on changing training data without being expressly programmed. In another aspect of a machine learning process 137, weights W1-W6 can be automatically varied over time within valid ranges and the performance of predictions provides with use of differentiated weight profiles can be monitored over time and biased in favor of the better performing weight profiles. Performance monitoring of a prediction can be based e.g. on metrics regarding average container image download time in terms of bits/second.

At block 1314 container host node 130A can determine whether all container images referenced in the container image configuration data received at block 1301 have been obtained, e.g. identified and subject to a pointer set at block 1304 or have been cached, e.g. at blocks 1311 and/or 1313 and if so, can proceed to block 1318 to build the container image specified in the container image configuration data received at block 1301.

Based on container host node 130A determining at block 1314 that there are remaining container image(s) to obtain that are referenced in the container image configuration data received at block 1301, container host node 130A can proceed to block 1315 to determine whether a timeout condition has occurred. Provided a timeout condition has not occurred, container host node 130A can return to block 1306 to re-multicast the request for remaining container images.

Container host node 130A on determining at block 1315 that a timeout has occurred can proceed to block 1316 to request additional remaining container image(s) from central container image repository 140 for receipt by central container image repository 140 at block 1401. In response to receiving the request for additional container image layer image(s) at block 1401, central container image repository 140 can proceed to block 1402 to send the requested container layer image(s) for receipt by container host node 130A at block 1317.

Container host node 130A at block 1318 can initiate building the specified container specified by the configuration data received at block 1301 based on all referenced container images having been obtained. It will be understood that in some use cases, container host node 130A can initiate container image building earlier than at block 1318 e.g. as early as block 1302 where the current highest order parent container image of the container image specified for building is among the set of currently obtained container images.

At block 1319, container host node 130A can run the built container on container host node 130A. Using a DOCKER® platform, a container can be run using a RUN command or a START command.

At block 1320, container host node 130A can run IH process 136 to return an image hash ID for received container image(s) received from central container image repository 140 at block 1317. The returned image hash ID resulting from running IH process 136 can be stored in IHT 2323 of local container image repository 132 of container host node 130A to update IHT 2323 which IHT data can be iteratively be pushed upward to push container image repositories as set forth herein. At block 1321 container host node 130A can return to block 1301 to await next container image configuration data that may be specified by an administrator user using administrator user interface 400, as depicted in FIG. 4.

Embodiments herein recognize that the behavior of container host node 130A can adapt as additional container images are stored locally, and can adapt over time as additional container image content is stored locally on respective local container image repository 132 of respective container host nodes 130A-130Z. In one use case, container host nodes 130A-130Z can be deployed for use by a certain enterprise, e.g. business or other organizational enterprise and additionally on deployment can store locally no container images.

Referring to FIG. 5, the container identified by container identifier IA001 can be a container specified for launching on container host node 130A and can be the first ever container launched on any of container host nodes 130A-130Z. Further referring to FIG. 5, the container specified by a container identifier IA057 specified by the identifier IA00N, can be the Nth container launched on any of the container host nodes 130A-130Z and can also be launched by container host node 130A.

Referring to a first iteration of blocks 1301-1321 performed by container host node 130A for performance of container build process 134 and container run process 135, container host node 130A can perform launching of the initial enterprise container specified by the identifier IA001 (FIG. 5) having the structure specified as follows: layer 1 specified by the identifier S001, layer 2 specified by the identifier W001, layer 3 specified by the identifier D001, and layer 4 specified by the identifier A001. According to one embodiment, the layer identifier S001 can specify the operating system modification UBUNTU®, W001 can specify the webservice NGINX®, D001 can specify the development platform TOMCAT®, and A001 can specify custom application layer code.

On the first iteration of blocks 1301-1321 for building the container identified by the identifier IA001 (FIG. 5) container host node, it will be understood that container host node 130A at check local repository block 1322 will identify no data (local container image repository 132 of container host node 130A will be empty at that time) and processing will proceed to block 1306 to multicast requests for remaining layers without a pointer being set at block 1304. Further, with reference to the initially launched container identified by the identifier IA001 (FIG. 5) there will be no returned identifying matching layers resulting from the multicast request at block 1306 (local container image repository 132 of respective container host nodes 130B-130Z will also be empty at that time) and the multicast request at block 1306 will simply time out at block 1315. Accordingly, in respect to an initially built container image being the container image identified by identifier IA001 (FIG. 5) an entirety of container images referenced in container image configuration data received at block 1301 can be returned from central container image repository 140 in response to request for container image(s) by container host node 130A at block 1315 to central container image repository 140 received by central container image repository 140 at block 1401 and responded to at block 1402 to send container layer image(s) for receipt by container host node 130A at block 1317.

Continuing with the example of the flowchart of FIG. 3A-3B, an administrator user a period of time after building and running to launch the container image identified by identifier IA001 (FIG. 5) on container host node 130A, may decide to build and run to launch the container image identified by identifier IA00N (FIG. 5) on container host node 130A. Between the time of launching the container image identified by identifier IA001 and the container image identified by IA00N, one or more container images may have been launched on each container host node of container host nodes 130A-130Z.

Referring to the container identified by identifier by IA00N (FIG. 5) and continuing with the scenario described, the container image identified by identifier IA00N can include: a first container image defining a first layer provided by the container image having the identifier S002, a second container image defining a second layer having an identifier specified by layer ID W002, a third container image defining a third layer specified by the identifier D001, and a fourth container image defining a fourth layer having an identifier A00N. In the described example, container image ID S002 can specify the OS modification container image ID for the OS modification container image layer UBUNTU®, W002 can specify the webservice container image ID for the webservice JETTY®, D001 can specify the container image ID for the development platform TOMCAT®, and A00N can specify the container image ID for custom application code.

Referring to the iteration of blocks 1301-1321 performed by container host node 130A, wherein container host node 130A launches the container image identified by identifier IA00N (FIG. 5) it will be seen that during performance of block 1322 to check a local repository of container host node 130A block 1322 can be expected to return positive hits. Namely, the specified container image ID S001 specified by the container image configuration data received at block 1301 has already been stored in local container image repository 132, and therefore a hit can be expected to be returned at block 1322 for the container image ID S001. Based on a matching between container image ID D001 specified in received container image configuration data received at block 1301 and the same container image ID D001 being recorded in local container image repository 132 of container host node 130A a hit can also be expected for the container image ID D001.

At block 1306, continuing the example of launching the container image identified by identifier IA00N (FIG. 5), container host node 130A at block 1306 can multicast a request for remaining container image(s). By the time of launching of the container identified by identifier IA00N the respective local container image repositories 132 of container host nodes 130B-130Z may have accumulated container image(s) specified in the container image configuration data received at block 1301, pursuant e.g. to local container image builds that are built using a text based container image build files. Container host node 130A at blocks 1311 and 1313 can receive and cache such additional container image(s). Further additional container image(s) where referenced in container image configuration data received at block 1301 can be received from central container image repository 140 at block 1317. Container host node 130A can build the defined container image specified by container image configuration data received at block 1301 using container image content identified by the pointer set at block 1304 and/or container image content cached at blocks 1311 and/or blocks 1313 and/or container image content received from central container image repository 140 at block 1317. Container host node 130A can run the built container image at block 1319, and can then run IHT process 135 at block 1320 to return a container image hash (IH) ID for the received container image content received at block 1317 and using the returned image layer hash ID can update IHT 2323 of local container image repository 132.

Some embodiments set forth herein may include one, or more, of the following features, operations, advantages and/or characteristics: (i) an image distribution service masterless container image repository service; (ii) a method to run a container image repository (e.g. DOCKER® container image) repository inside an enterprise in an efficient way without a dedicated image repository server such as central container image repository 140; (iii) a system that more fully utilizes the resources on each compute node; (iv) a system to distribute container images in a masterless mode through each compute node in parallel; (v) a method and system to allow container host nodes to obtain required container images defining layers in a much faster way; (vi) a method to provide a repository service through a floating volume across VMs inside a physical host which can save cost for dedicated server/storage and reduce the performance impact during container run time; (vii) include first and second components as follows: (a) an IHT (Image Hash Table) as part of masterless container image (e.g. DOCKER®) repository service, wherein each container host node in an internal containerized platform has its own data reflecting what container image(s) it has, and/or (b) an IHT process that can be provided as plugin or standalone process to maintain/update the content of image hash tables associated to respective container host nodes; (viii) using IHT capability, a floating volume that reduces redundant download process and enhance the container performance through reducing intensive I/O (input/output) on each container host node; (ix) any container host node (virtual machine) running on the same computing node provided by a physical computing node host can share a common IHT servicing the container host nodes running on the physical host; (x) any container host node that requests to pull images can hit the physical host's IHT first before it sends request outside e.g. to peer container host node; (xi) when any container host node updates its IHT, it will update the physical host's IHT at the same time; and/or (xii) each container host node can use container images downloaded in a floating volume across a physical host, e.g. to build a new container image composited from such downloaded container images, without its own copy of the downloaded container images.

Embodiments herein recognize that container based virtualization can potentially feature high speed to deploy a new application, however it still highly depends on the container image size and network bandwidth to retrieve the dependent image. Embodiments herein recognize that container technologies include use of public image repositories that provide container images to the public and private image repositories, e.g. accessible via subscription.

There is set forth herein according to one embodiment a method to provide a distributed container image repository inside an enterprise in an efficient way without use of a dedicated repository server. A method as set forth herein can more fully utilize the resources on each container host node.

There is set forth herein a method according to one embodiment wherein a container host node can request its local container image repository having an IHT to check an existing container image list, and if the container image exists, start to build and run a new container image to provide a runtime container.

There is set forth herein a method according to one embodiment wherein, when there is no existing container image on a local container image repository having an IHT, multicasting a message to request the container image with proper authentication, and set a timeout for waiting. The multicast request can be multicast to peer container host nodes.

There is set forth herein a method according to one embodiment wherein, when there is only one peer container host node responding with container image ID and timestamp and other performance metrics like CPU utilization metrics, memory utilization metrics, and I/O loading metrics satisfying one or more criterion, initiating container image pull immediately from the one peer container host node having the image ID and updating a local IHT to reference the newly pulled container image.

There is set forth herein a method according to one embodiment wherein, when there are multiple container host nodes responding, if all top layer container image IDs are the same, pull image layers from those responding nodes with better performance metrics. If the container image IDs are mismatched, get the image which has the latest timestamp, then update local IHT to reference the newly pulled container image.

There is set forth herein a method according to one embodiment wherein, when there is a timeout, pulling by a container host node a container image from an image hub (e.g. central container image repository 140) directly, and update the local IHT of the container host node to reference the newly pulled image.

There is set forth herein according to one embodiment a method wherein a container host node compares metrics received from responding peer container host nodes and sends a container image pull request to certain peer container host node predicted to be the best performing container host node based on an examining of the metrics.

There is set forth herein according to one embodiment a method wherein a container host node downloads simultaneously and in parallel first and second and in one embodiment all required container images defining layers in a defined composited container image defined by administrator user defined configuration data, and then building and running the defined composited container image.

Figure 10:
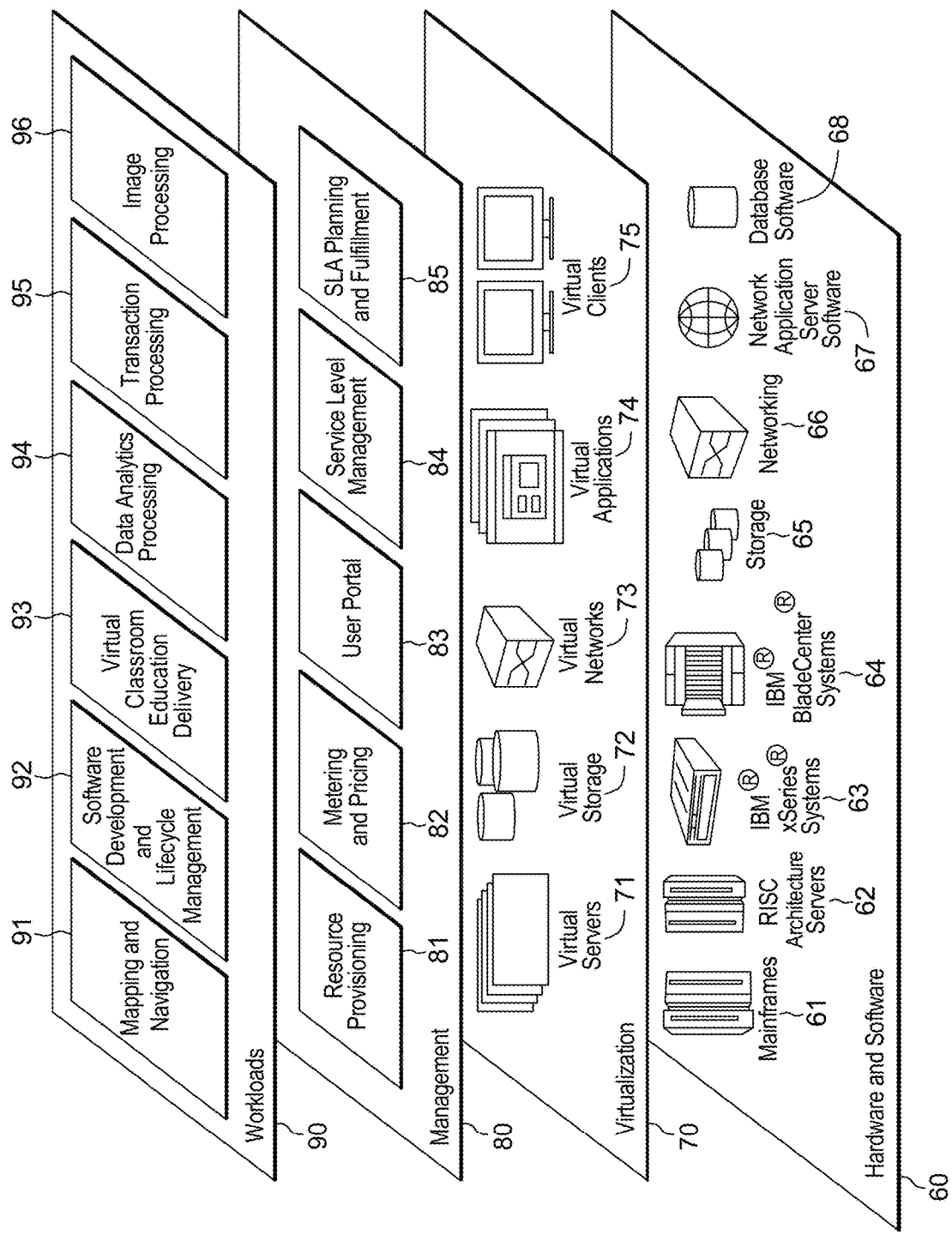
FIG. 10 depicts abstraction model layers according to one embodiment.

There is set forth herein according to one embodiment a plurality of container host nodes sharing and being associated to a shared container image data repository defining a shared data repository volume across a physical host. For example, a plurality of container host nodes can be provided by a plurality of VMs (traditional hypervisor based) hosted on a computing node 10 provided by a physical computing node and the plurality of nodes can share volume of an image repository provided on a system memory of the computing node 10. The shared data repository volume can reduce redundant download processes and enhance the container performance through reducing intensive I/O on each container host node. Accordingly, a container host node provided by a virtual machine can be hosted on computing node 10 (as shown in FIG. 10) and the container host node can share a container image repository volume with other VMs hosted on computing node 10. When a container host node configured as described requests to pull container images, the request can hit the physical host's container image registry having an IHT first before it is sent to a peer container host node.

There is set forth herein a method wherein, when any container host node updates its IHT, it can update the IHT of its associated physical host e.g. computing node 10 at the same time, wherein a container host node is provided by a VM (traditional hypervisor based) and includes the architecture set forth in FIG. 1B.

There is set forth a method wherein each container host node can use container image layers downloaded in a floating volume defined by a shared container image repository shared across physical host without its own copy.

Certain embodiments herein may offer various technical computing advantages involving computing advantages to address problems arising in the realm of computer networks. Embodiments herein can feature for example storage distribution for improved installation and running of container images. On the building by a certain container host node of container image content received from a central image repository the container image content can be made available for request and transmission by the container host node to peer container host nodes. A distributed data storage network can be defined to reduce or avoid container launch delays attributable, e.g. to container image downloads and bottlenecking attributable to multiple container host nodes making simultaneous requests to a central container image repository. Embodiments herein can feature for example use of container image repositories associated with each of a plurality of container host nodes. Embodiments herein can feature for example use of local container image repositories associated with each of a plurality of container host nodes. Embodiments herein can feature for example use of shared container image repositories associated with two or more container host nodes, where the two or more container host nodes are provided by hypervisor based virtual machines hosted by common computing node provided by a physical computing node. Embodiments herein can feature hashing container images downloaded from a central container image repository and examining returned hash IDs to determine whether an identified container image is a most recent version. Embodiments can feature artificial intelligence (AI) decision making, and use of machine learning to update AI decision processes so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence (AI) platforms, and machine learning platforms. Embodiments herein can employ data structuring processes, e.g. processing for transforming unstructured data into a form optimized for computerized processing. Embodiments herein can include artificial intelligence (AI) processing platforms featuring improved processes to transform unstructured data into structured form permitting computer based analytics and decision making.

Figure 8:
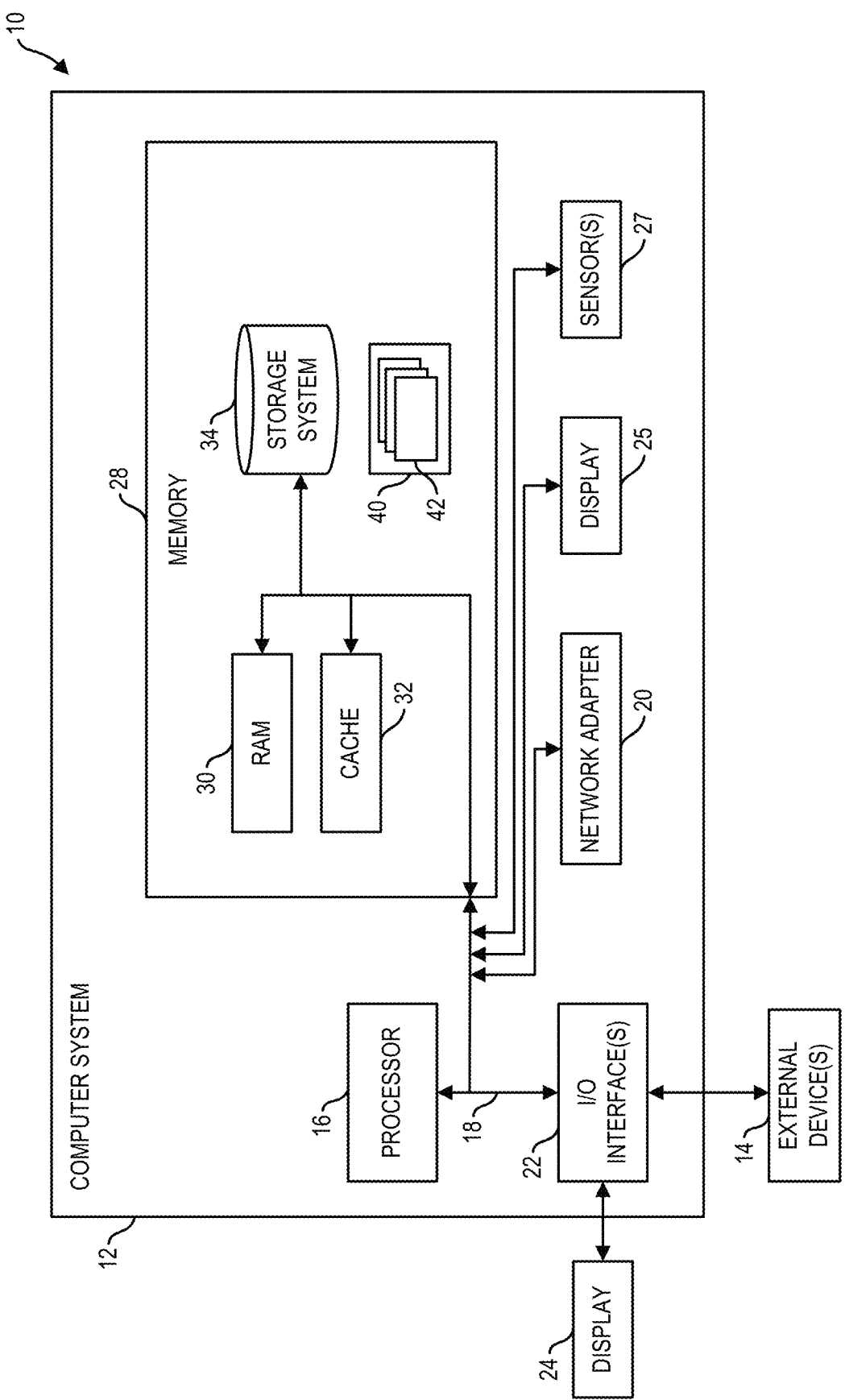
FIG. 8 depicts a computing node according to one embodiment.
Figure 9:
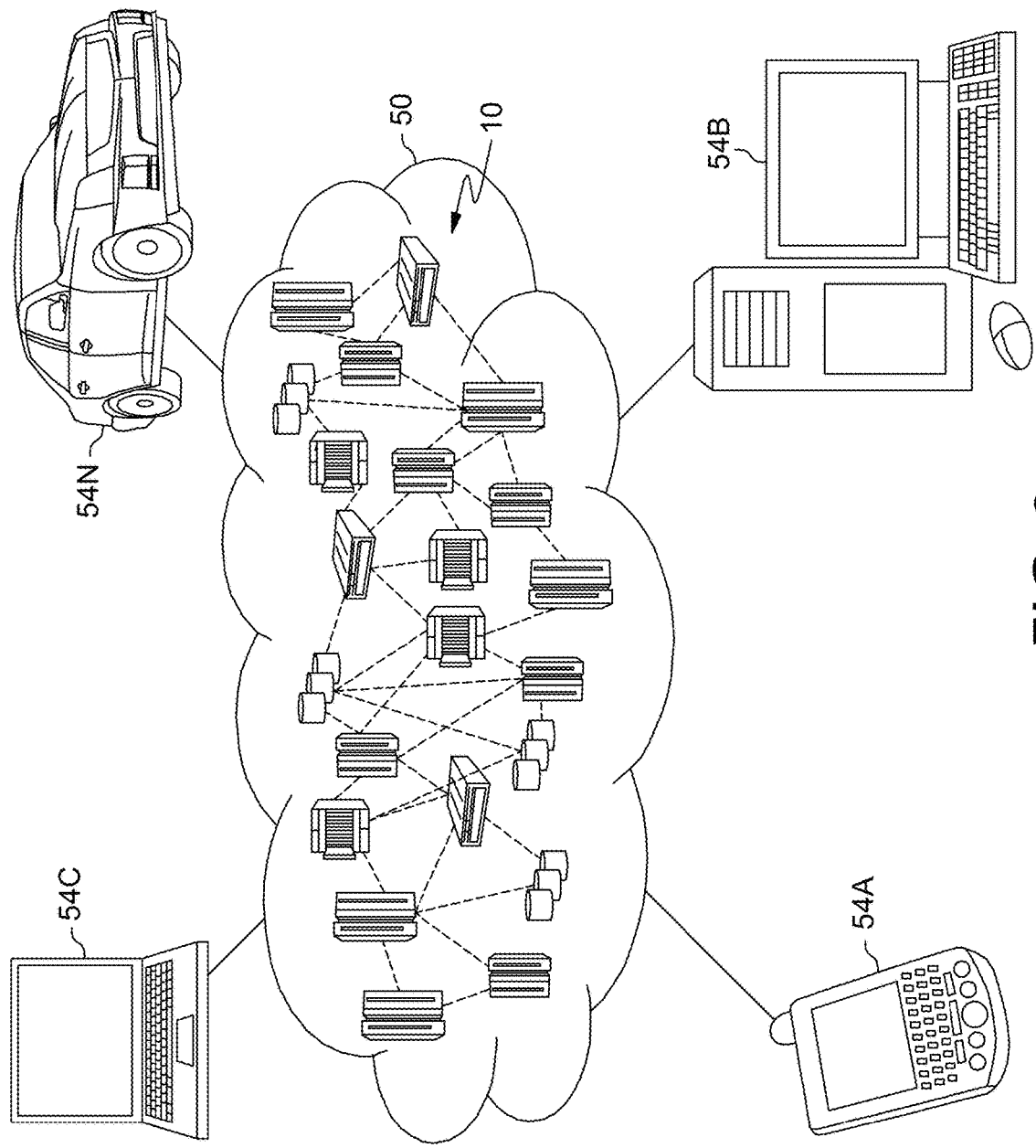
FIG. 9 depicts a cloud computing environment according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, a container host node as set forth herein, e.g. of container host nodes 130A-130Z can run on a computing node 10 and can include one or more program 40 for performing functions described with reference to container host node 130A as set forth in the flowchart of FIG. 3A-3B. In one embodiment, a container host node as set forth herein can include one or more program 40 for performing functions described with reference to container host node 130B as set forth in the flowchart of FIG. 3A-3B. In one embodiment, a container host node as set forth herein can include one or more program 40 for performing functions described with reference to container host node 130C as set forth in the flowchart of FIG. 3A-3B. In one embodiment, a central container image repository 140 as set forth herein can include one or more computing node 10 and can include one or more program 40 for performing functions described with reference to central container image repository 140 as set forth in the flowchart of FIG. 3A-3B. In one embodiment, the computing node based systems and devices depicted in FIG. 1A can include one or more program 40 for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for obtaining container images as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method for use with a plurality of peer container host nodes, the plurality of peer container host nodes including a first container host node and a second container host node and defining a set of peer container host nodes of the first container host node, the method comprising:

receiving, by a first container host node, container image configuration data, the container image configuration data referencing a plurality of images;

determining, by the first container host node, that a first image of the plurality of images is not available at the first container host node;

responsive to the determination that the first image of the plurality of images is not available at the first container host node, multicasting, by the first container host node, to the set of peer container host nodes of the first container host node, a request for the first image;

responsive to the multicasting of the request, receiving, by the first container host node, from a second container host node, the first image;

building, by the first container host node, a container image according to the container image configuration data, the building including using the first image received from the first container host node; and instantiating, by the first container host node, a container from the container image;

wherein the method includes hashing container images downloaded from a container image repository to (a) the first container host node and (b) container host nodes of the set of peer container host nodes to provide image hash table data that associates container image IDs and container image hash IDs to timestamps that specify a time of performing the hashing, wherein the method includes sending, by the first container host node, an image pull request to pull a certain image from a certain container host node of the set of peer container host nodes, wherein the method includes determining the certain container host node using the image hash table data, the image hash table data including a timestamp that indicates that the certain container host node stores a most recent version of the certain image accessible from the set of peer container host nodes.

2. The method of claim 1, wherein container image repositories of the second container host node and a third container host node store a certain image of the plurality of images, wherein the second container host node has a first level of physical association to the first container host node, and the third container host node has a second level of physical association to the first container host node, the first level being greater than the second level, wherein the method includes examining data indicating the first level of physical association of the second container host node to the first container host node and the second level of physical association of the third container host node to the first container host node, wherein the method includes determining that the second container host node is the container host node from which to request the certain image, wherein the determining is in dependence on the examining and wherein the method includes sending, by the first container host node, a container image pull request to the second container host node requesting pulling of the certain image from the second container host node to the first container host node.

3. The method of claim 1, wherein the method includes determining a latency score for the container host nodes of the set of peer container host nodes, wherein the determining a latency score includes using a function based on multiple factors, the multiple factors including a CPU utilization factor, a memory utilization factor, an I/O utilization factor, and a historical factor based on container image download times from the container host nodes of the set of container host nodes.

4. The method of claim 1, wherein the container image configuration data is defined by a text based container image build file that encodes a sequence of commands, and wherein the receiving, by the first container host node, at least one container image from at least one container host node of the set of peer container host nodes in response to the multicasting includes simultaneously receiving in parallel (a) a first image of the plurality of images from a first container host node of the set of peer container host nodes, and (b) a second image of the plurality of images from a second container host node of the set of peer container host nodes.

5. The method of claim 1, wherein the method includes the first container host node obtaining performance metrics from the set of peer container host nodes of the first container host node, predicting based on an examining of the performance metrics that a certain container host node of the set of peer container host nodes satisfies one or more performance criterion and requesting a container image pull from the certain container host node of the set of peer container host nodes.

6. A method comprising:
obtaining, by a container host node, container image configuration data that defines a specified container image configuration, the specified container image configuration referencing first through Nth container images that define layers of the specified container image configuration, wherein the container host node includes an associated container image repository for storing container images;
multicasting, by the container host node, a request for one or more image of the first through Nth container images to a set of container host nodes, wherein each container host node of the set of container host nodes is a peer container host node of the container host node, wherein each container host node of the set of container host nodes is configured to launch containers and wherein each container host node of the set of container host nodes has a container image repository associated thereto for storing container images;
receiving, by the container host node, at least one container image from at least one container host node of the set of container host nodes in response to the multicasting;
building, by the container host node, a specified container image according to the specified container image configuration using the at least one container image received by the receiving; and
running, by the container host node, the specified container image built by the building to define a runtime container;
wherein the method includes hashing container images downloaded from a container image repository to (a) the container host node and (b) container host nodes of the set of container host nodes to provide image hash table data that associates container image IDs and container image hash IDs to timestamps that specify a time of performing the hashing, wherein the method includes sending, by the container host node, an image pull request to pull a certain image of the at least one container image to a certain container host node of the set of container host nodes, wherein the method includes determining the certain container host node using the image hash table data, the image hash table data including a timestamp that indicates that the certain container host node stores a most recent version of the certain image accessible from the set of container host nodes.

7. The method of claim 6, wherein method includes sending a request for a specified image of the first through Nth container images to a central container image repository, wherein the method includes performing the sending in response to a determining subsequent to the multicasting, that there are remaining referenced container images of the first through Nth container images to be obtained, wherein the set of container host nodes are located in a first data center, and wherein the central container image repository is located in a second data center external to the first data center.

8. The method of claim 6, wherein method includes sending, by the container host node, a request for a specified image of the first through Nth container images to a central container image repository, and obtaining the specified image from the central container image repository, wherein the method includes in response to the obtaining the specified image hashing the specified image to return an image hash ID for the specified image and recording the image hash ID into an image hash table of the associated container image repository associated to the container host node.

9. The method of claim 6, wherein the method includes one or more of the following selected from the group consisting of (a) obtaining performance metrics from a plurality of container host nodes of the set of container host nodes, predicting based on an examining of the performance metrics that a certain container host node of the plurality of container host nodes satisfies one or more performance criterion and requesting a container image pull from the certain container host node of the plurality of container host nodes and (b) obtaining performance metrics for container host nodes of the set of container host nodes, and based on an examining of the performance metrics requesting a container image pull from a certain container host node of the set of container host nodes, wherein the examining includes determining a latency score for the container host nodes of the set of container host nodes, wherein the determining a latency score includes using a function based on multiple factors, the multiple factors including a CPU utilization factor, a memory utilization factor, an I/O utilization factor, and a historical factor based on container image download times from the container host nodes of the set of container host nodes.

10. The method of claim 6, wherein container image repositories of a second container host node and a third container host node store a certain container image of the first through Nth container images, wherein the second container host node has a first level of physical association to the container host node, and the third container host node has a second level of physical association to the container host node, the first level being greater than the second level, wherein the method includes examining data indicating the first level of physical association of the second container host node to the container host node and the second level of physical association of the third container host node to the container host node, wherein the method includes determining that the second container host node is the container host node from which to request the certain container image, wherein the determining is in dependence on the examining and wherein the method includes sending, by the container host node, a container image pull request to the second container host node requesting pulling of the certain container image from the second container host node to the container host node.

11. The method of claim 6, wherein the method includes providing a common image hash table that records data describing container images stored on image repositories associated to respective container host nodes of multiple container host nodes, the multiple container host nodes including the set of container host nodes and additional container host nodes, and wherein the method includes querying the common hash table to return hash table data and based on the returned hash table data filtering the multicast so that the request for an image of the first through Nth container images is selectively sent to limited ones of the multiple container host nodes, the limited ones of the multiple container host nodes being the set of container host nodes.

12. The method of claim 6, wherein the container image configuration data is defined by a text based container image build file that encodes a sequence of commands, and wherein the receiving, by the container host node, at least one container image from at least one container host node of the set of container host nodes in response to the multicasting includes simultaneously receiving in parallel (a) a first container image of the first through Nth container images from a first container host node of the set of container host nodes, and (b) a second container image of the first through Nth container images from a second container host node of the set of container host nodes.

13. The method of claim 6, wherein the container host node is provided by a hypervisor based virtual machine that is hosted on a physical computing node and wherein the container host node is associated to a floating volume shared container image repository, the shared container image repository being associated to the physical computing node, wherein a certain container host node is provided by a hypervisor based virtual machine hosted on the physical computing node and wherein the certain container host node shares the floating volume shared container image repository.

14. The method of claim 6, wherein the associated container image repository associated to the container host node for storing container images includes a local container image repository associated to the container host node.

15. The method of claim 6, wherein the associated container image repository for storing container images associated to the container host node includes a shared container image repository associated to the container host node, the shared container image repository being associated to a second container host node.

16. The method of claim 6, wherein the container host node is associated to first and second container image repositories, the first container image repository being a local container image repository associated to the container host node, the second container image repository being a shared container image repository associated to the container host node, the shared container image repository being associated to a second container host node.

17. The method of claim 6, wherein the method includes determining a latency score for the container host nodes of the set of peer container host nodes, wherein the determining a latency score includes using a function based on multiple factors, the multiple factors including a CPU utilization factor, a memory utilization factor, an I/O utilization factor, and a historical factor based on container image download times from the container host nodes of the set of container host nodes.

18. The method of claim 6, wherein the method includes the container host node obtaining performance metrics from the set of peer container host nodes of the container host node, predicting based on an examining of the performance metrics that a certain container host node of the set of peer container host nodes satisfies one or more performance criterion and requesting a container image pull from the certain container host node of the set of peer container host nodes.

19. A method comprising:
receiving, by a container host node, from a requesting peer container host node a request for one or more container image referenced in a specified container image configuration that references first through Nth container images that define layers of the specified container image configuration;
responding, by the container host node, to the request with performance metric data specifying performance metrics of the container host node;
receiving, by the container host node, an image pull request from the requesting peer container host node, the image pull request including an image pull request for a certain container image stored on a container image repository associated to the container host node;
the image pull request being in dependence on a predicting with use of the performance metrics data that the container host node satisfies one or more performance criterion; and
sending, by the container host node, the certain container image to the requesting peer container host node;
wherein the method includes hashing container images downloaded from a container image repository to (a) the container host node and (b) container host nodes of a set of container host nodes to provide image hash table data that associates container image IDs and container image hash IDs to timestamps that specify a time of performing the hashing, wherein the method includes sending, by the container host node, an image pull request to pull a certain image of at least one container image to a certain container host node of the set of container host nodes, wherein the method includes determining the certain container host node using the image hash table data, the image hash table data including a timestamp that indicates that the certain container host node stores a most recent version of the certain image accessible from the set of container host nodes.

20. The method of claim 19, further characterized by at least one of the following selected from the group consisting of: (a) the container host node and the requesting peer container host node are configured to launch containers, and wherein the performance metric data includes one or more or the following selected from the group consisting of CPU utilization metric data, a memory utilization metric data, I/O utilization metric data and, and historical performance metric data based on historical container image download times from the container host node; (b) the container host node is provided by a hypervisor based virtual machine that is hosted on a physical computing node and wherein the container host node is associated to a floating volume shared container image repository, the shared container image repository being associated to the physical computing node, wherein a certain container host node is provided by a hypervisor based virtual machine hosted on the physical computing node and wherein the certain container host node shares the floating volume shared container image repository; (c) the container image repository associated to the container host node is a local container image repository associated to the container host node, the local container image repository being provided on a system memory of the container host node, the system memory being selected from the group consisting of a virtual machine system memory and a physical computing node system memory; (d) the container image repository associated to the container host node is provided by a floating volume shared container image repository, wherein the container host node is provided by a hypervisor based virtual machine hosted by a physical computing node and wherein the floating volume shared container image repository is shared by the container host node and at least one other container host node that is provided by a hypervisor based virtual machine hosted by the physical computing node; (e) the container image repository associated to the container host node is a local container image repository associated to the container host node, and wherein the container host node is associated to a second container image repository provided by a floating volume shared container image repository, wherein the container host node is provided by a hypervisor based virtual machine hosted by a physical computing node and wherein the floating volume shared container image repository is shared by the container host node and at least one other container host node that is provided by a hypervisor based virtual machine hosted by the physical computing, wherein the performance metric data includes (i) metric data of a first data path including the local container image repository and (ii) metric data of a second data path that includes the floating volume shared container image repository.

* * * * *